US007770487B2

(12) United States Patent
Kumar et al.

(10) Patent No.: US 7,770,487 B2
(45) Date of Patent: Aug. 10, 2010

(54) VEHICLE STEERING COLUMN STRUCTURE

(75) Inventors: Amarendra Kumar, Novi, MI (US); Hirotake Harada, Fujisawa (JP)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 606 days.

(21) Appl. No.: 11/694,628

(22) Filed: Mar. 30, 2007

(65) Prior Publication Data
US 2008/0238068 A1   Oct. 2, 2008

(51) Int. Cl.
B62D 1/18   (2006.01)
(52) U.S. Cl. .......................................... 74/493; 280/775
(58) Field of Classification Search .................. 74/492, 74/493; 280/775
See application file for complete search history.

(56) References Cited

U.S. PATENT DOCUMENTS

| 4,793,204 | A |   | 12/1988 | Kubasiak |         |
|-----------|---|---|---------|----------|---------|
| 5,144,855 | A |   | 9/1992  | Yamaguchi et al. | |
| 5,269,562 | A | * | 12/1993 | Peitsmeier et al. | 280/775 |
| 6,035,739 | A |   | 3/2000  | Milton   |         |
| 6,325,724 | B1|   | 12/2001 | Sato et al. |     |
| 6,443,491 | B1|   | 9/2002  | Fukunaga |         |
| 6,902,192 | B2|   | 6/2005  | Sato et al. |     |
| 6,986,531 | B2|   | 1/2006  | Ohtsu et al. |    |
| 7,069,809 | B2|   | 7/2006  | Sato et al. |     |
| 7,090,250 | B2|   | 8/2006  | Kinoshita et al. | |
| 7,127,963 | B2|   | 10/2006 | Lee      |         |
| 7,438,320 | B2| * | 10/2008 | Sato et al. | 280/775 |
| 2005/0081674 | A1 | | 4/2005 | Nishioka et al. | |
| 2005/0217408 | A1 | | 10/2005 | Sato et al. |  |
| 2008/0141815 | A1 | * | 6/2008 | Ridgway et al. | 74/493 |

FOREIGN PATENT DOCUMENTS

| GB | 2281375 | 3/1995 |
|----|---------|--------|
| WO | WO-2005/056366 A1 | 6/2005 |

* cited by examiner

Primary Examiner—Richard W Ridley
Assistant Examiner—Terence Boes
(74) Attorney, Agent, or Firm—Global IP Counselors, LLP

(57) ABSTRACT

A vehicle steering column structure includes a fixed steering column portion, a movable steering column portion movably coupled to the fixed steering column portion and a steering column positioning mechanism. The steering column positioning mechanism is operably coupled between the fixed and movable steering column portions for adjusting a relative position therebetween. The steering column positioning mechanism includes a release member and a biasing member. The biasing member biases the release member to a locking orientation such that the biasing force of the biasing member applied to the release member changes with corresponding movement of the release member along a first movement portion of a prescribed movement range and the biasing force of the biasing member is generally constant with movement of the release member along a second movement portion of the prescribed movement range.

19 Claims, 17 Drawing Sheets

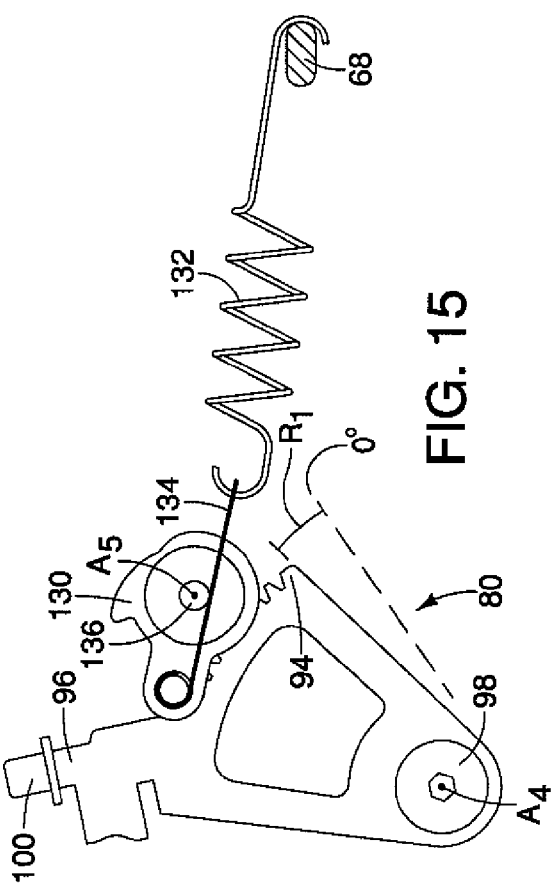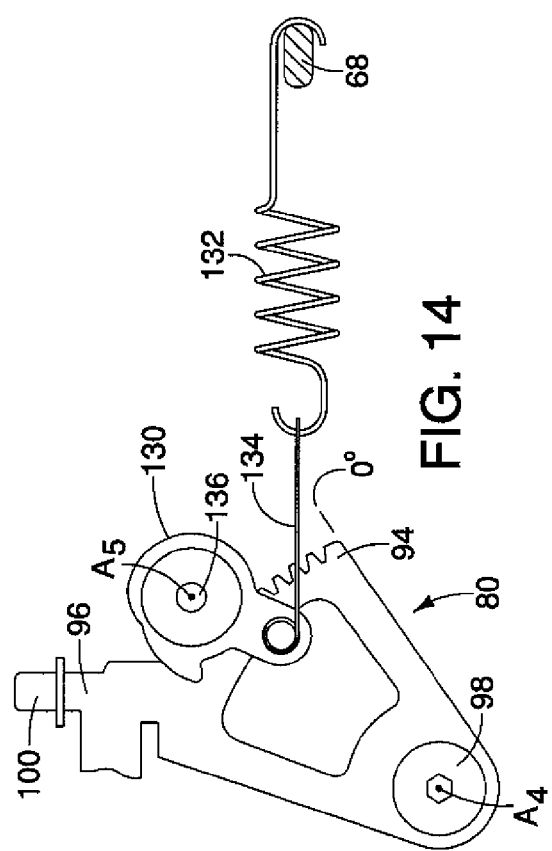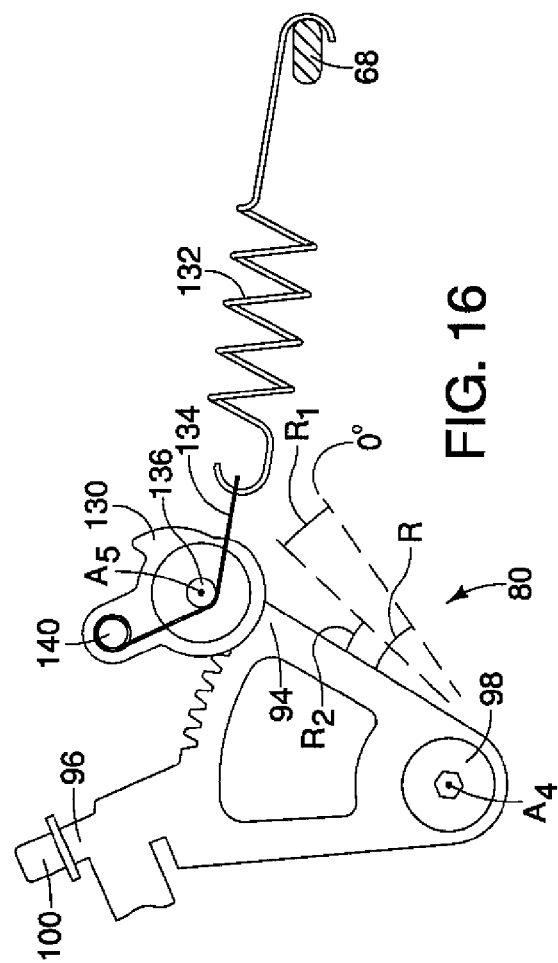
FIG. 14
FIG. 15
FIG. 16

VEHICLE STEERING COLUMN STRUCTURE

BACKGROUND OF THE INVENTION

1. Field of the Invention

The present invention relates to a hand operated release mechanism for a steering column with a tilting mechanism and/or a telescoping mechanism. More specifically, the present invention relates to a hand operated release mechanism that operates one or both of a tilting mechanism and a telescoping mechanism.

2. Background Information

A steering column structure in a vehicle is sometimes provided with one or both of a telescoping mechanism and/or a tilting mechanism that allows a driver to more comfortably position a steering wheel at a distal end of the steering column structure. Such steering column structures often include a manual or hand operated release mechanism that moves from a locking orientation to a releasing orientation. In the locking orientation, the telescoping mechanism and/or a tilting mechanism is locked in position. In the releasing orientation, the telescoping mechanism and/or a tilting mechanism is unlocked and the steering wheel can be re-positioned. Typically biasing members such as springs are used to bias the telescoping mechanism and/or a tilting mechanism in the locking orientation. If the biasing force applied to the telescoping mechanism and/or a tilting mechanism is not sufficient to urge the telescoping mechanism and/or a tilting mechanism back to the locking orientation or if not uniform throughout the movement of the hand operated release mechanism, the driver can feel uneasy about the operation of the steering column structure.

In view of the above, it will be apparent to those skilled in the art from this disclosure that there exists a need for an improved steering column structure that ensures sufficient biasing force to return the telescoping mechanism and/or a tilting mechanism to a locked orientation. This invention addresses this need in the art as well as other needs, which will become apparent to those skilled in the art from this disclosure.

SUMMARY OF THE INVENTION

One object of the present invention is to provide a more consistent level of biasing force to a hand operated release mechanism to return the hand operated release mechanism to a locked orientation.

Another object of the present invention is to provide a more consistent level of biasing force to a hand operated release mechanism so that a driver has a more consistent level of resistance to movement of the hand operated release mechanism during movement between a locked orientation and a release orientation.

In accordance with one aspect of the present invention, a vehicle steering column structure includes a fixed steering column portion, a movable steering column portion movably coupled to the fixed steering column portion and a steering column positioning mechanism. The steering column positioning mechanism is operably coupled between the fixed and movable steering column portions for adjusting a relative position therebetween. The steering column positioning mechanism includes a release member and a biasing member. The release member is movably mounted between a locking orientation and a releasing orientation along a prescribed movement range having a first movement portion and a second movement portion subsequent to the first movement portion, with a transition point located between the first and second movement portions that is spaced from the releasing and locking orientations. The biasing member biases the release member to the locking orientation such that the biasing force of the biasing member applied to the release member changes with corresponding movement of the release member along the first movement portion and the biasing force of the biasing member is generally constant with movement of the release member along the second movement portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 14 is a side view of portions of the hand operated release mechanism showing a portion of the lever and the biasing assembly upside down, the biasing assembly including a biasing member, a cam wheel and a flexible connecting portion, with the hand operated release mechanism in the locking orientation in accordance with one embodiment of the present invention;

FIG. 15 is another view of portions of the hand operated release mechanism similar to FIG. 14 showing the hand operated release mechanism in an intermediate orientation between the locking orientation and the release orientation with the flexible connecting portion contacting a shaft extending from the center of the cam wheel in accordance with one embodiment of the present invention;

FIG. 16 is still another view of portions of the hand operated release mechanism similar to FIGS. 14 and 15 showing the hand operated release mechanism in the release orientation with the flexible connecting portion flexibly bent at least part way around the shaft extending from the center of the cam wheel in accordance with one embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
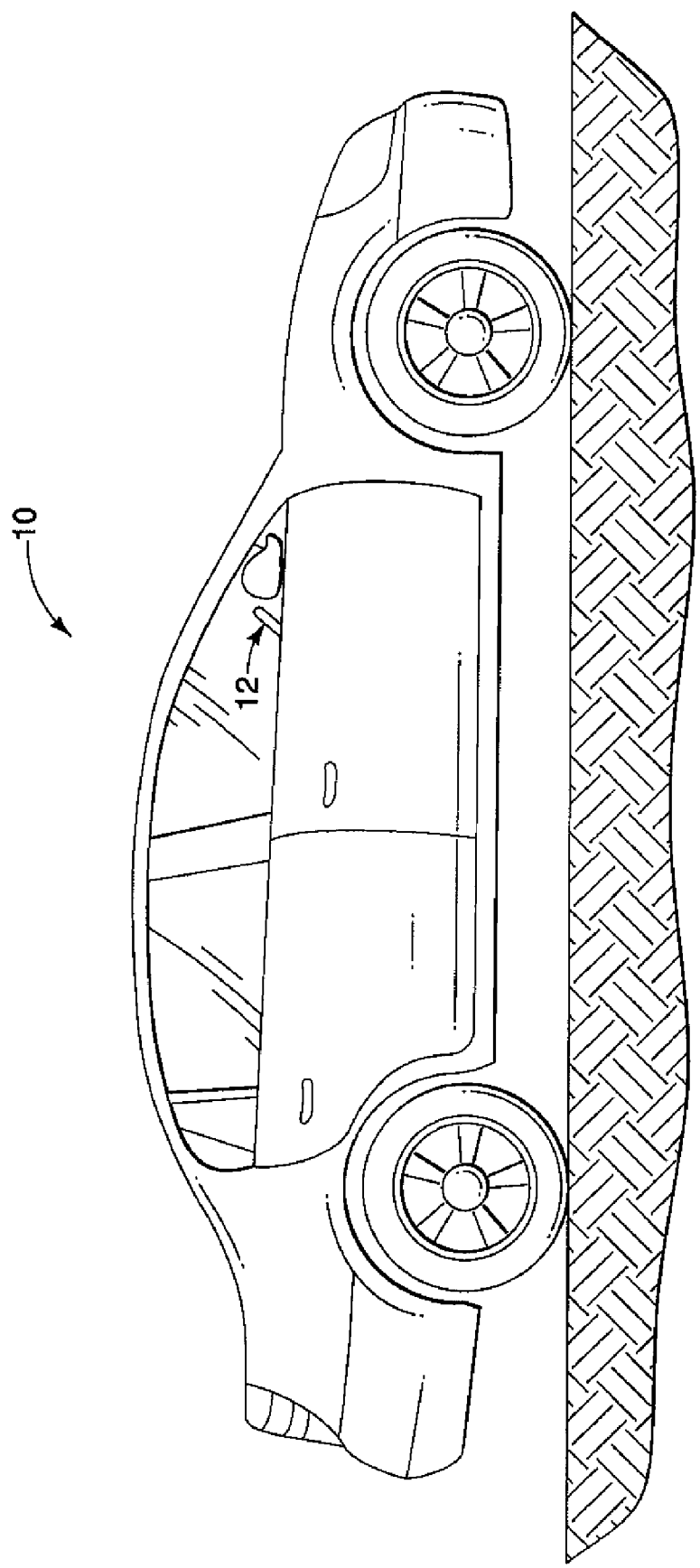
FIG. 1 is a side elevational view of a vehicle that includes a steering column structure in accordance with one embodiment of the present invention.

Referring initially to FIG. 1, a vehicle 10 having a steering column structure 12 is illustrated in accordance with a first embodiment of the present invention. As described in greater detail below, the steering column structure 12 includes telescoping and tilting capabilities that are controlled by a hand operated release mechanism 14 (shown in FIGS. 2-4). The present invention includes improvements to the hand operated release mechanism 14 (a steering column positioning mechanism).

The vehicle 10 is a conventional passenger vehicle. Therefore description of the various portions of the vehicle 10 is omitted for the sake of brevity. Rather, the description below focuses instead on the steering column structure 12 and the hand operated release mechanism 14.

Figure 2:
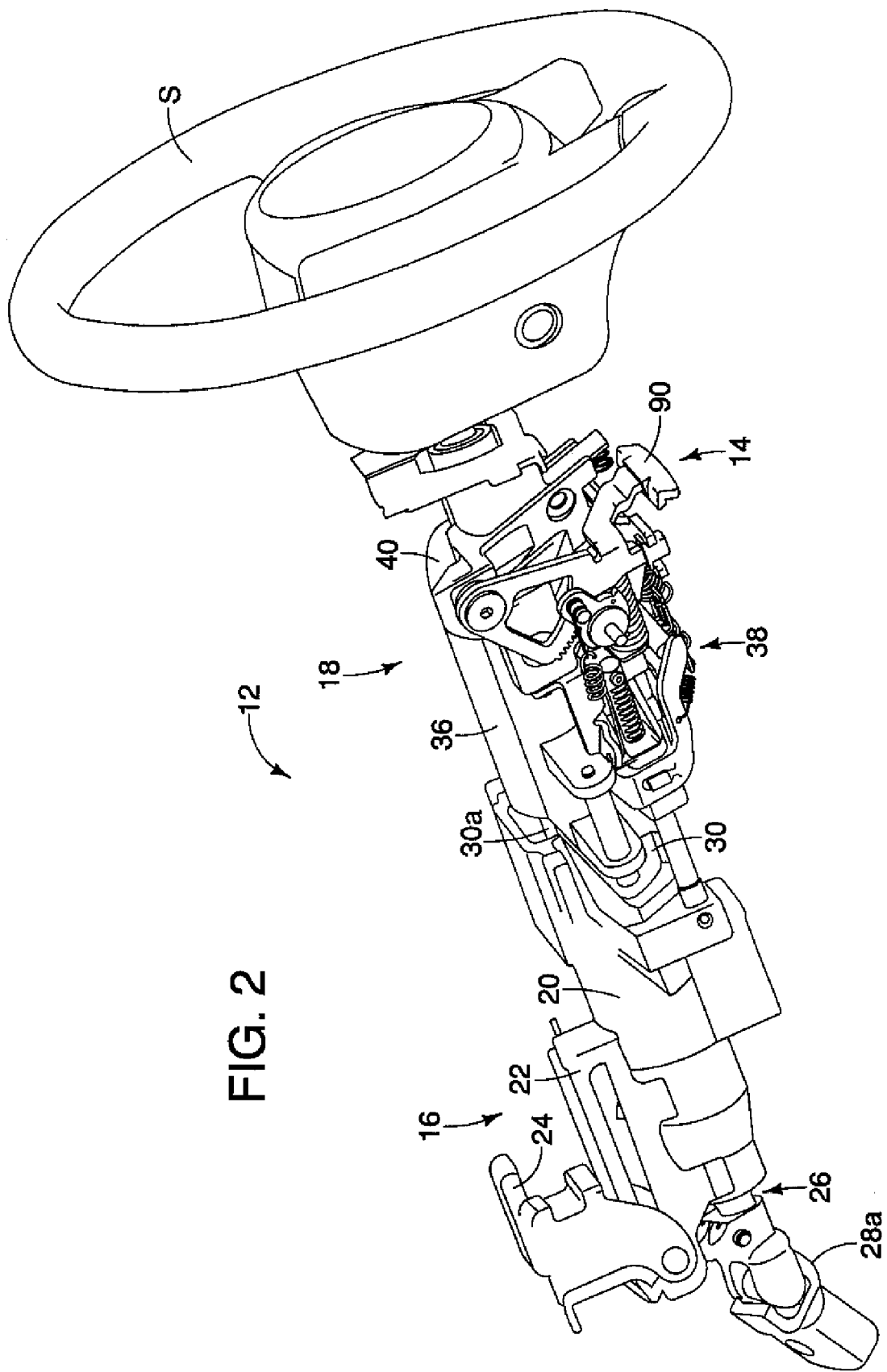
FIG. 2 is a perspective view of the steering column structure removed from the vehicle, and with trim and decorative features removed to show a fixed steering column portion, a movable steering column portion and portions of a hand operated release mechanism, with a telescoping housing of the movable steering column portion telescopically retracted and a tilting housing of the movable steering column portion tilted downward in accordance with one embodiment of the present invention.
Figure 3:
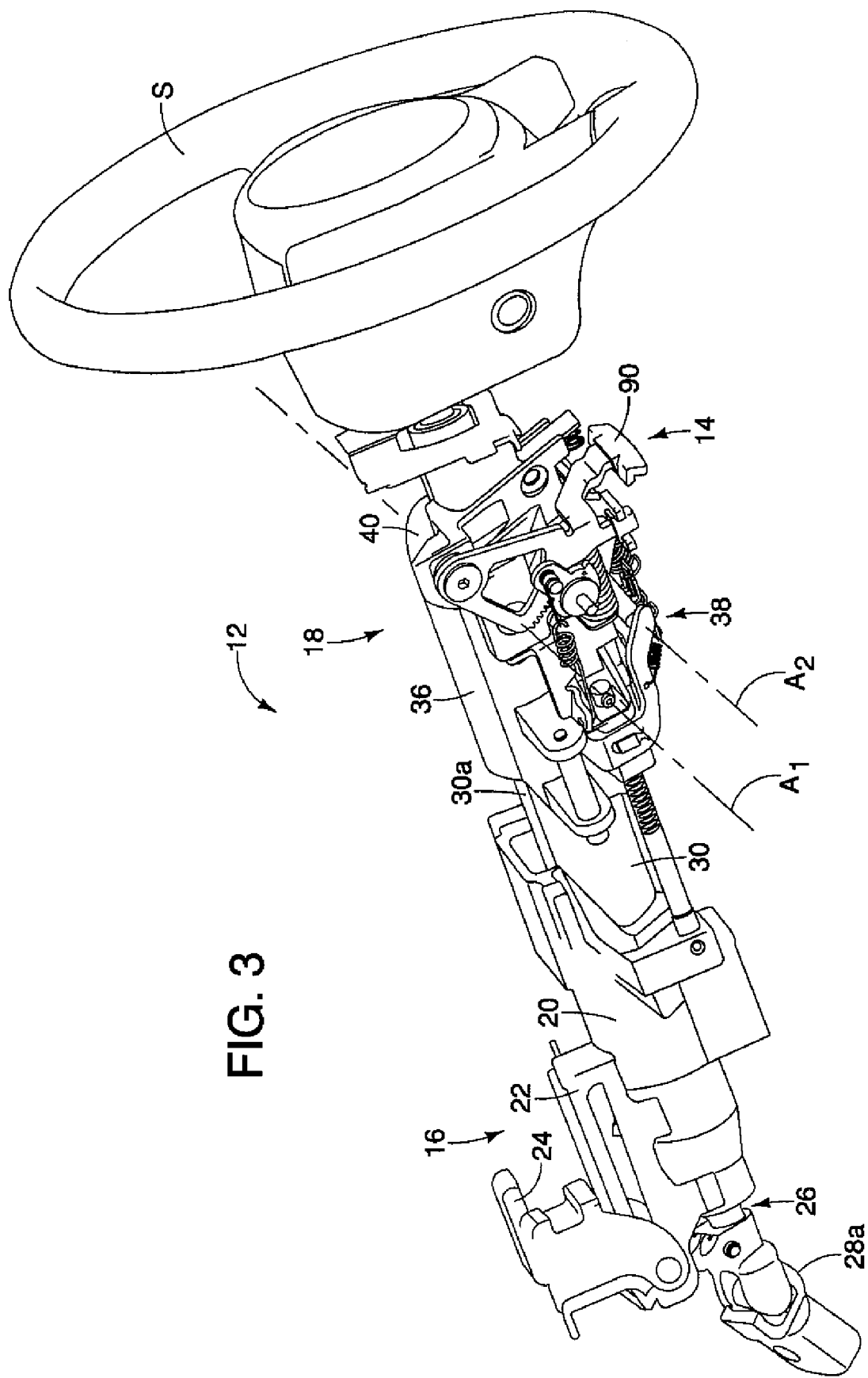
FIG. 3 a perspective view of the steering column structure similar to FIG. 2, showing the telescoping housing of the movable steering column portion telescopically extended in accordance with one embodiment of the present invention.
Figure 4:
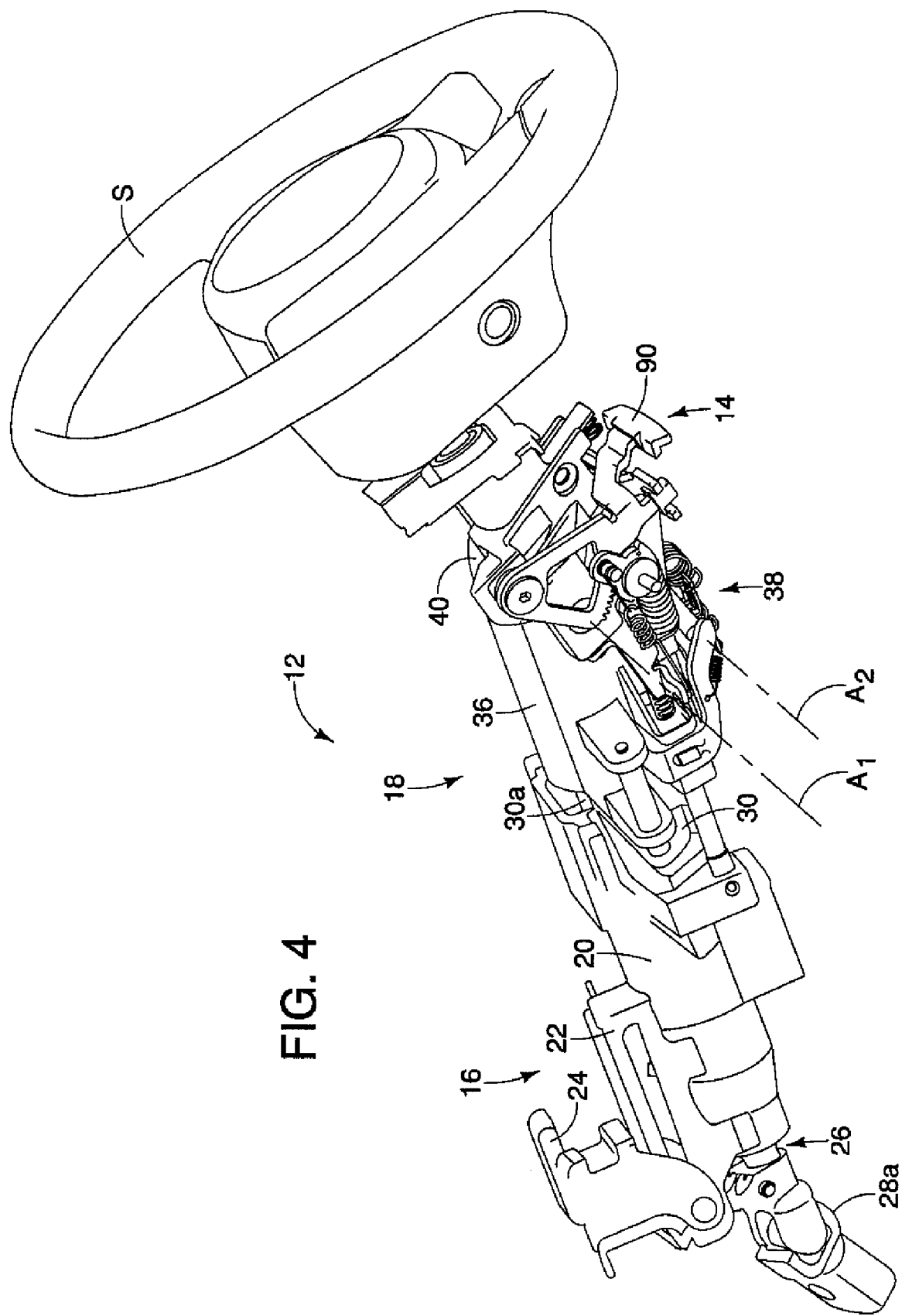
FIG. 4 a perspective view of the steering column structure similar to FIG. 2, showing the tilting portion of the movable steering column portion tilted upward in accordance with one embodiment of the present invention.

A general description of the steering column structure 12 is now provided with initial reference to FIGS. 2, 3 and 4. In FIGS. 2, 3 and 4, the steering column structure 12 is shown removed from the vehicle 10. Further, the steering column structure 12 is shown with all trim and decorative elements removed to reveal the underlying structure. It should be understood from the drawings and the description herein that the steering column structure 12 is installed in the vehicle 10 in a conventional manner.

As shown in FIGS. 2, 3 and 4, the steering column structure 12 basically includes a fixed steering column portion 16, a movable steering column portion 18 and the hand operated release mechanism 14.

The fixed steering column portion 16 includes a support housing 20, a support member 22, a mounting bracket 24, a shaft assembly 26 that includes U-joints 28a and 28b, and a cylindrically shaped support shell 30. The support housing 20 is a hollow member that is supported within the interior of the vehicle 10 by attachment features of the support member 22 and the mounting bracket 24 in a conventional manner.

The shaft assembly 26 extends though the hollow interior of the support housing 20, a hollow interior portion (not shown) of the cylindrically shaped support shell 30 and the movable steering column portion 18, as described below.

Figure 8:
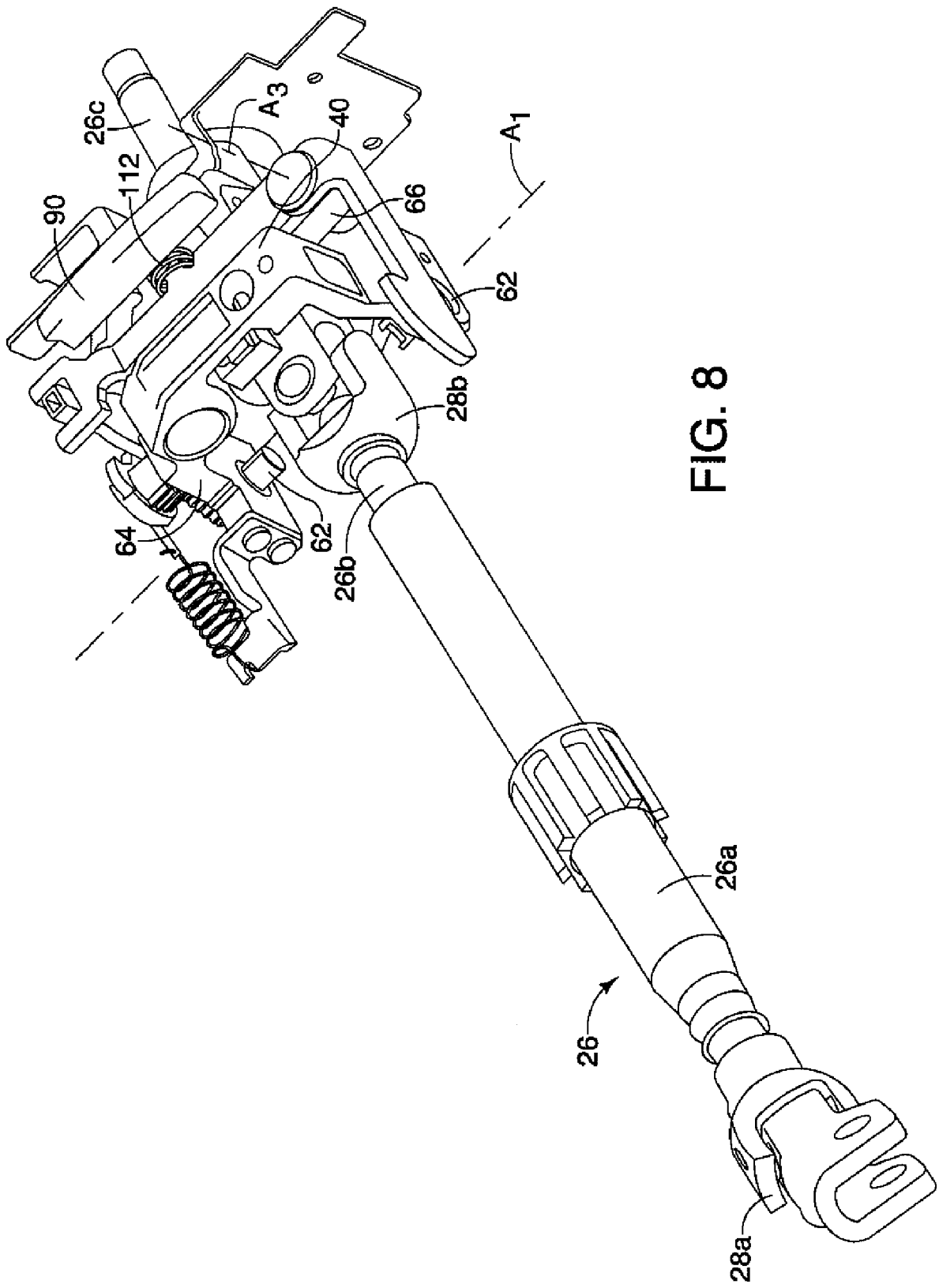
FIG. 8 is a perspective view of the underside of the steering column structure with both the fixed and movable steering column portions removed to show a telescoping steering shaft assembly that includes two U-joint assemblies in accordance with one embodiment of the present invention.

Referring now to FIG. 8, the shaft assembly 26 is shown with the support housing 20, the support member 22 and the cylindrically shaped support shell 30 removed to show otherwise hidden detail. The shaft assembly 26 includes the U-joint 28a, a shaft portion 26a, a shaft portion 26b, the U-joint 28b and a shaft portion 26c. The U-joint 28a is a conventional constant velocity type device that is fixed to the shaft portion 26a for rotation therewith. The U-joint 28a is configured to operably connect the shaft assembly 26 to a conventional steering box (not shown) or conventional steering elements (not shown) of the vehicle 10.

The shaft portion 26a is a hollow member with conventional internal splines (not shown). The shaft portion 26b has conventional external splines (not shown) that mate with the internal splines of the shaft portion 26a. The shaft portion 26b can slide along the length of the interior of the shaft portion 26a in a telescoping manner. However, the conventional splines ensure that the shaft portion 26a and the shaft portion 26b always rotate together as a single shaft.

Figure 9:
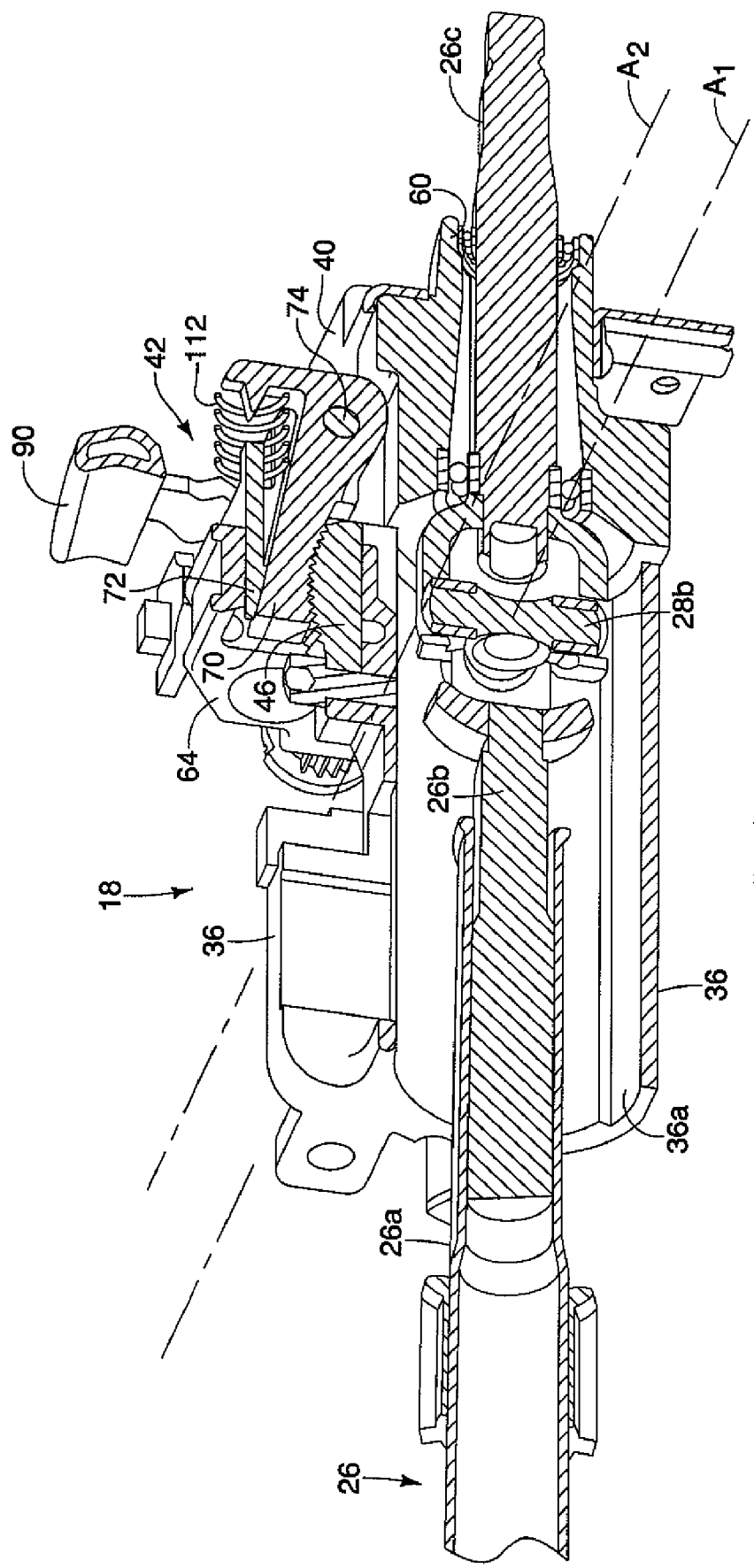
FIG. 9 is a perspective cross-sectional view of the movable steering column portion showing features of the telescoping steering shaft assembly and portions of a telescoping mechanism, with the tilting mechanism in a locking orientation in accordance with one embodiment of the present invention.

As shown in FIG. 9, the U-joint 28b is a convention conventional constant velocity type device that is fixed at one end to the shaft portion 26b and fixed at its other end to the shaft portion 26c. The U-joint 28b is centered on and tilts about an axis $A_1$ along with a tilting housing 40 that is described further below. The shaft portion 26c is configured to support a steering wheel S in a conventional manner. As shown in FIG. 9, the shaft portion 26c extends outward from the movable steering column portion 18, thereby defining a distal end of the movable steering column portion 18. The shaft portion 26c is rotatably supported with the tilting housing 40 as described in greater detail below.

Figure 5:
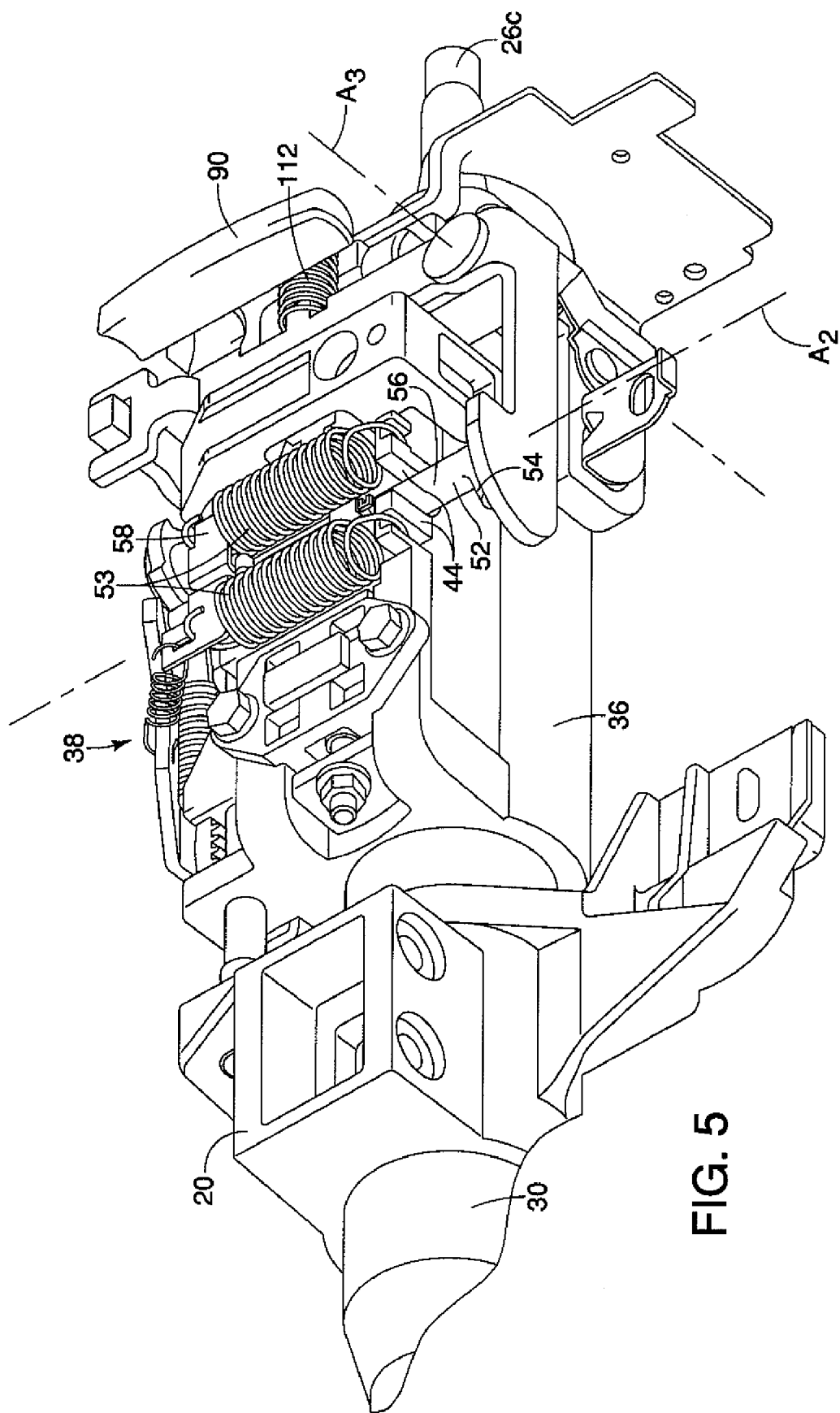
FIG. 5 is a perspective view of an underside of the steering column structure turned upside down showing features of the movable steering column portion, the hand operated release mechanism and a telescoping mechanism in accordance with one embodiment of the present invention.
Figure 6:
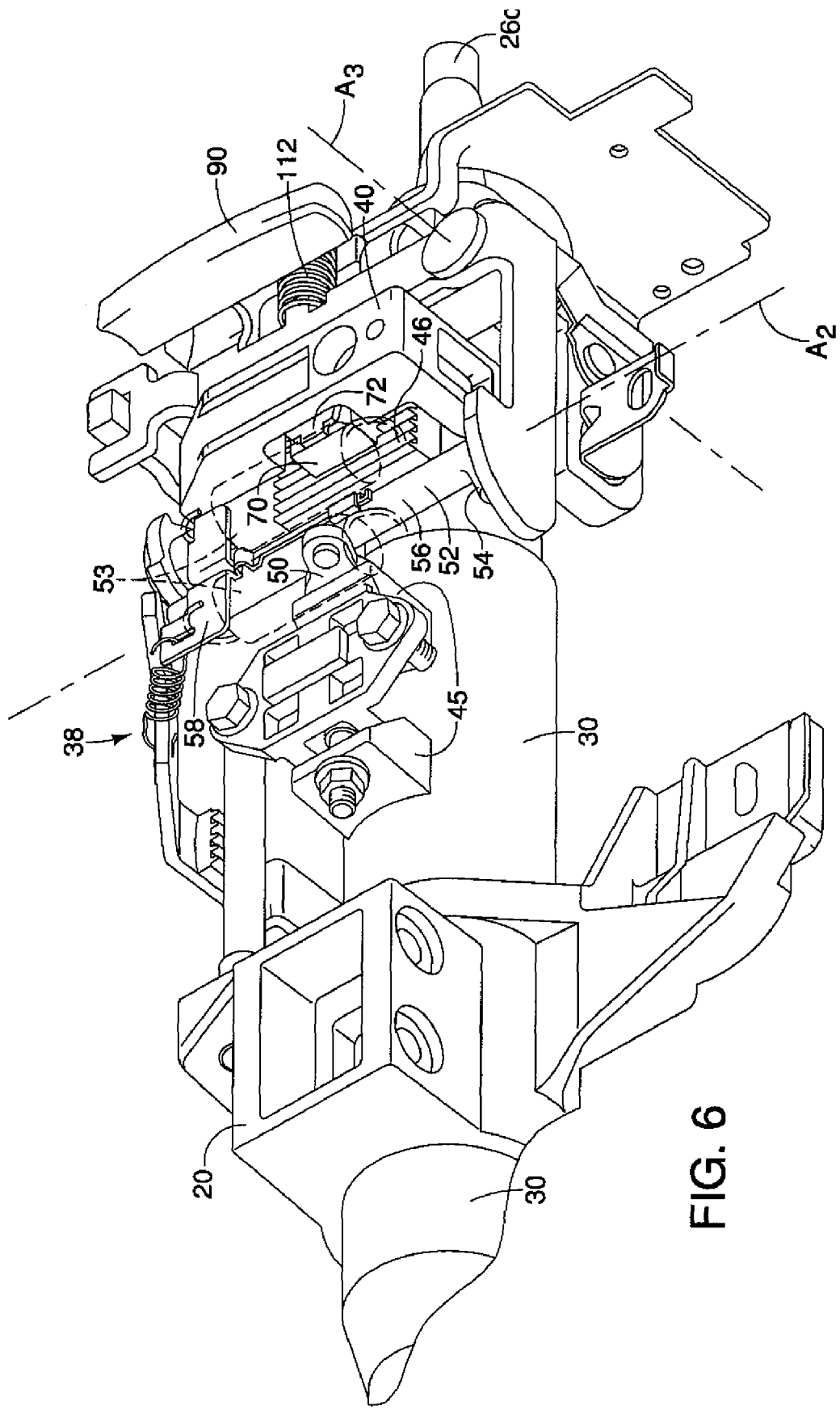
FIG. 6 is another perspective view of the underside of a portion of the steering column structure similar to FIG. 5, with portions of the movable steering column portion removed to reveal locking members of the telescoping mechanism depicted in a locking orientation in accordance with one embodiment of the present invention.
Figure 7:
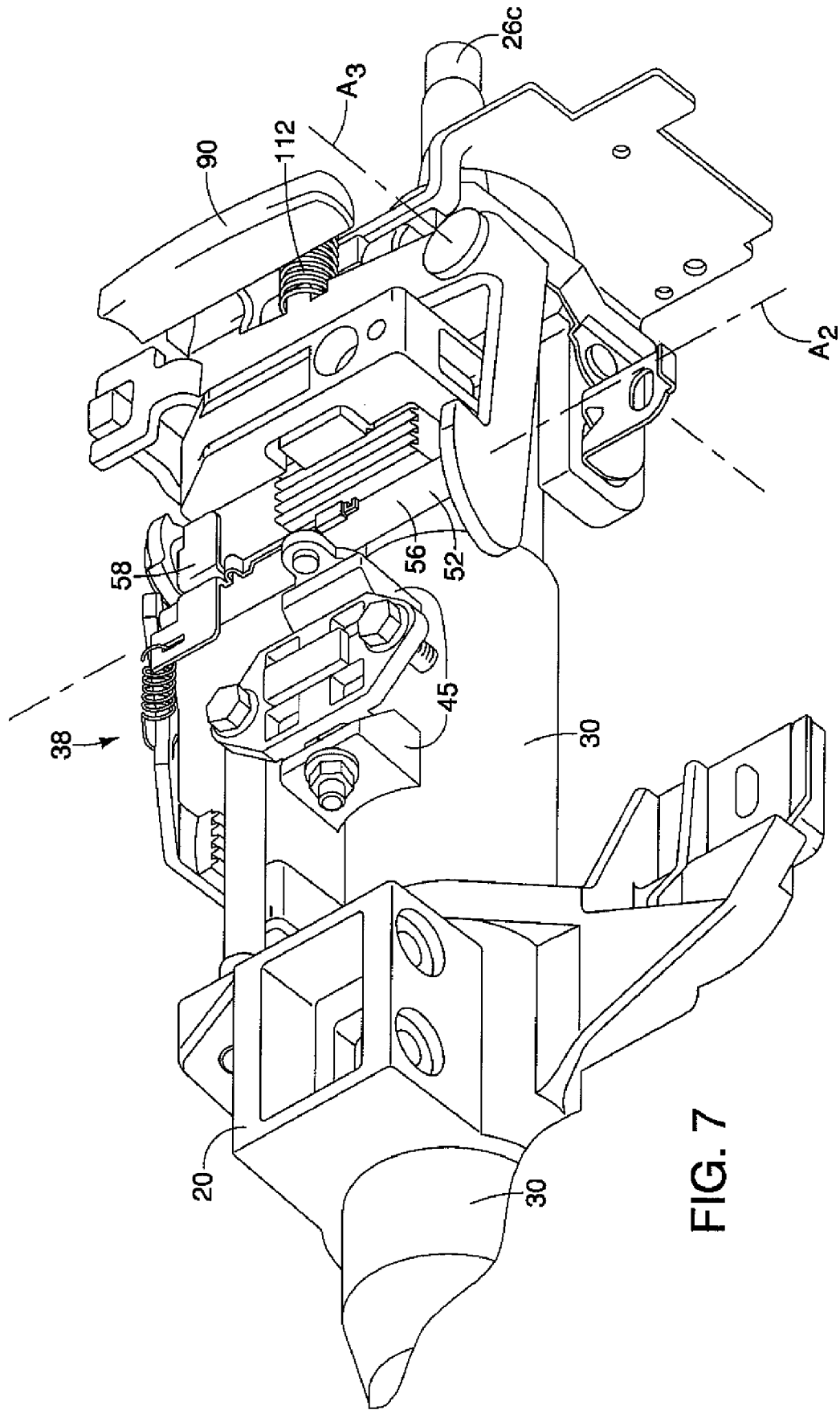
FIG. 7 is another perspective view of the underside of a portion of the steering column structure similar to FIG. 6, with portions of the movable steering column portion removed showing the locking members of the telescoping mechanism depicted in a releasing orientation to allow the movable steering column portion to telescopically move relative the fixed steering column portion in accordance with one embodiment of the present invention.

The cylindrically shaped support shell 30 is a hollow elongated member that is partially surrounded by and fixedly attached to the support housing 20 in a conventional manner. At least a portion of an upper surface of the cylindrically shaped support shell 30 is provided with a protrusion 30a that is visible in FIG. 3. The cylindrically shaped support shell 30 further extends into the hollow interior of the movable steering column portion 18 as shown in FIGS. 5, 6 and 7 and described in greater detail below.

Figure 10:
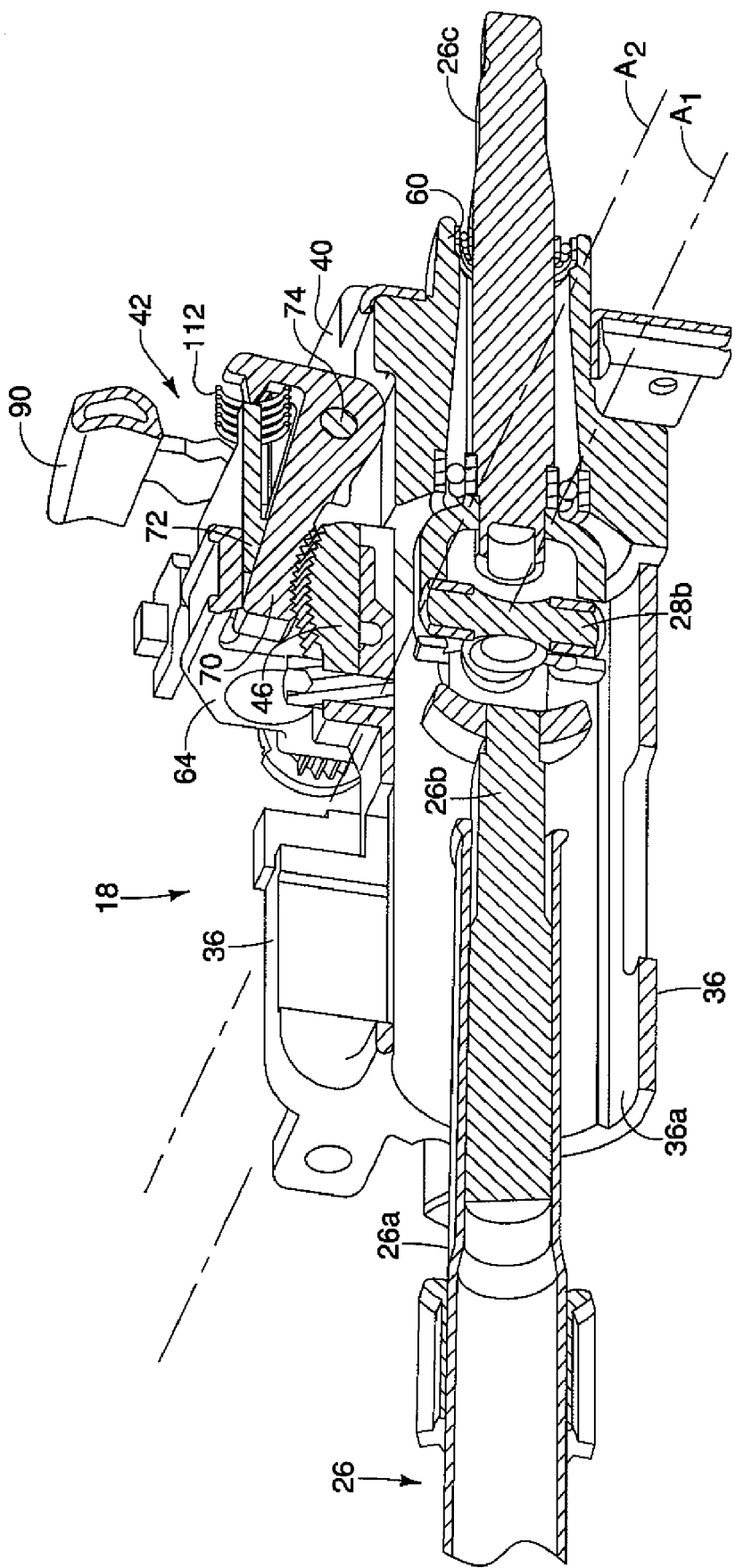
FIG. 10 is another perspective cross-sectional view of the movable steering column portion similar to FIG. 9 showing the tilting mechanism in a releasing orientation in accordance with one embodiment of the present invention.

As shown in FIGS. 2, 3 and 4, the movable steering column portion 18 basically includes a telescoping housing 36 (a telescoping part), a telescoping mechanism 38 (shown in FIGS. 6 and 7), the tilting housing 40 (a tilting part) and a tilting mechanism 42 (shown in FIGS. 9 and 10).

The telescoping housing 36 is a generally hollow shaped member that extends around the cylindrically shaped support shell 30. The hollow interior of the telescoping housing 36 is shown in FIGS. 9 and 10 and includes an elongated recess 36a dimensioned to receive the protrusion 30a of the cylindrically shaped support shell 30 (see FIGS. 9 and 10). The telescoping housing 36 is slidably disposed about the cylindrically shaped support shell 30. The protrusion 30a of the cylindrically shaped support shell 30 and the recess 36a of the telescoping housing 36 cooperate with one another allowing the telescoping housing 36 to slide (telescope) along the length of the cylindrically shaped support shell 30 in a conventional manner. However, the protrusion 30a and the recess 36a also cooperate with one another to prevent rotation of the telescoping housing 36 with respect to the cylindrically shaped support shell 30 and the fixed steering column portion 16. The telescoping housing 36 further includes spring mounting portions 44 (shown in FIGS. 5, 11 and 12) and a tilt locking portion 46 (shown in FIGS. 6, 7 and 9-11). The tilt locking portion 46 includes a curved surface centered about the axis $A_1$. The tilt locking portion 46 further includes series of conventional serrations or parallel gear teeth provided on the curved surface. The purpose of the tilt locking portion 46 is described further below.

As shown in FIG. 2, the telescoping housing 36 is in a retracted orientation (telescopically shortened) relative to the fixed steering column portion 16. In FIG. 3, the telescoping housing 36 is shown in an extended orientation (telescopically elongated) with the steering wheel S (distal end of the movable steering column portion 18) spaced apart by a prescribed distance from the support housing 20 of the fixed steering column portion 16.

The telescoping housing 36 is selectively held in position by the telescoping mechanism 38. More specifically, the telescoping mechanism 38 can move from a locking orientation shown in FIG. 6 to a releasing orientation shown in FIG. 7. In the locking orientation, the telescoping mechanism 38 nonmovably secures the telescoping housing 36 to the cylindrically shaped support shell 30. However, in the releasing orientation, the telescoping mechanism 38 allows the telescoping housing 36 to slide or telescope along the cylindrically shaped support shell 30 as shown by comparing FIGS. 2 and 3.

A description of the telescoping mechanism 38 is now provided with specific reference to FIGS. 5, 6 and 7. The telescoping mechanism 38 operably connects the telescoping housing 36 (the telescoping part) to the fixed steering column portion 16 to selectively adjust the distance between the steering wheel S (the distal end) of the movable steering column portion 18 and the fixed steering column portion 16.

FIGS. 5, 6 and 7 show an underside of the steering column structure 12. Specifically, the steering column structure 12 is turned upside down in FIGS. 5, 6 and 7. A portion of the telescoping housing 36 has been removed in FIGS. 6 and 7 to reveal various features of the telescoping mechanism 38.

As shown in FIGS. 6 and 7, the telescoping mechanism 38 basically includes a pair of locking members 45, a lever actuator device 50, a push rod 52 and biasing springs 53. The push rod 52 is operably connected to the lever actuator device 50 and the lever actuator device 50 is operably connected to the locking members 45. The locking members 45 are dimensioned to contact the outer surface of the cylindrically shaped support shell 30 in a conventional manner, as shown in FIG. 6. When the locking members 45 are urged into contact the cylindrically shaped support shell 30, the telescoping mechanism 38 is prevented from moving relative to the cylindrically shaped support shell 30, as shown in FIG. 6. With the locking members 45 disengaged from the cylindrically shaped support shell 30, the telescoping mechanism 38 is free to undergo telescopic movement relative to the cylindrically shaped support shell 30, as shown in FIG. 7.

As shown in FIGS. 5, 6, 11 and 12, the push rod 52 is an actuation member that includes a contact section 54, a rod section 56 (a release section) and a biasing spring engaging section 58. As indicated in FIGS. 5 and 6, the rod section 56 (the release section) has an elongated rod shape that extends in a first direction along an axis $A_2$. The contact section 54 extends in a second direction that is approximately perpendicular to the rod section 56 and the axis $A_2$. The rod section 56 is configured to undergo reciprocating movement along the axis $A_2$. Although the rod section 56 of the push rod 52 is configured to undergo reciprocating or sliding movement along the axis $A_2$, the push rod 52 is supported on the telescoping housing 36. Therefore, the push rod 52 moves with the telescoping housing 36 and the movable steering column portion 18 in any telescopic movement.

The biasing springs 53 are connected at respective first ends to the spring mounting portions 44 of the telescoping housing 36. The biasing springs 53 are connected at respective second ends to the biasing spring engaging section 58. Hence, the biasing springs 53 bias the push rod 52 in the locking orientation such that the locking members 45 are biased into firm engagement with the cylindrically shaped support shell 30. The biasing springs 53 also bias the push rod 52 in a direction that urges the hand operated release mechanism 14 to move from the releasing orientation (FIG. 7) to the locking orientation (FIG. 6), as described in greater detail below.

Figure 11:
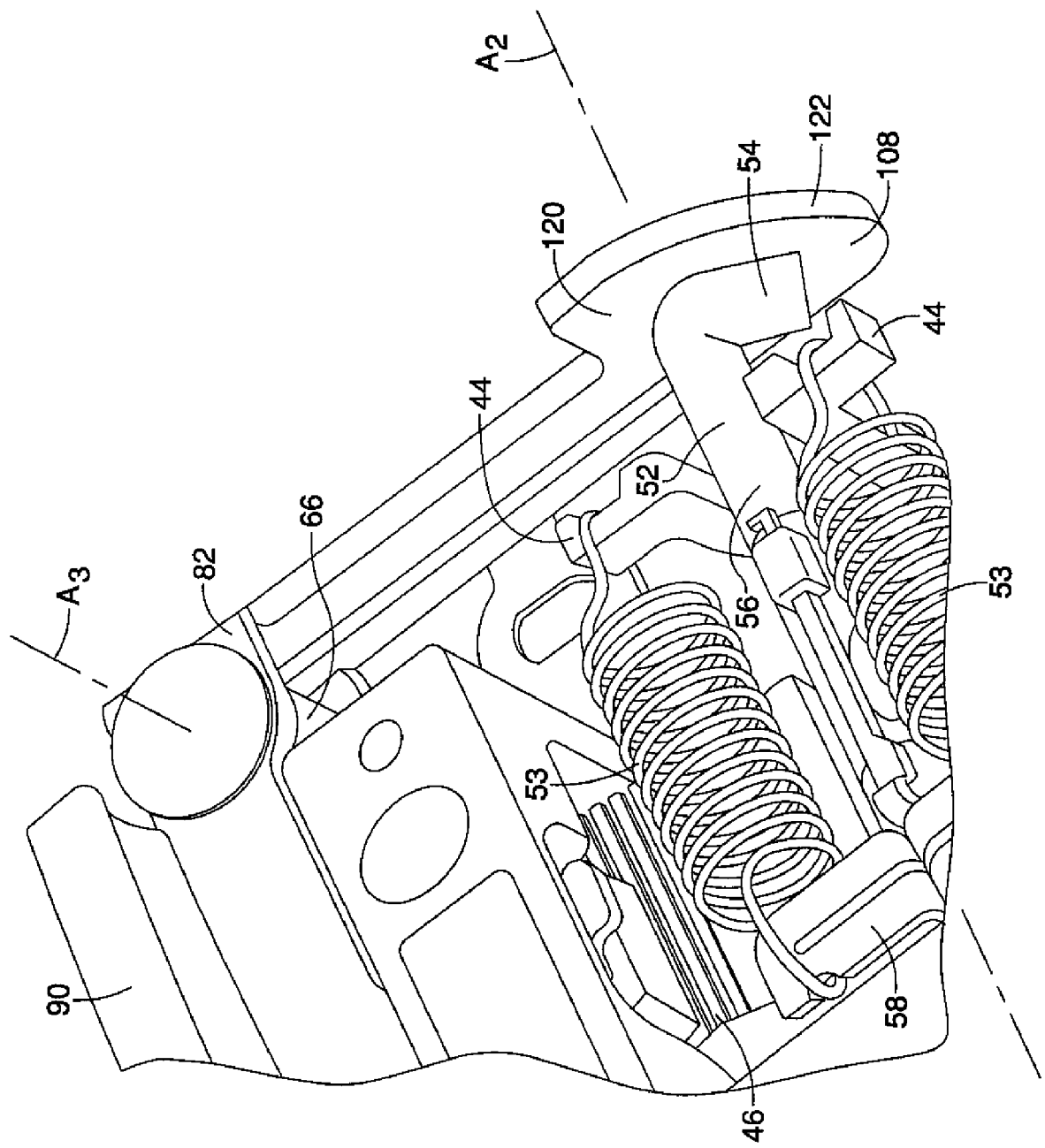
FIG. 11 is a perspective view of a portion of the underside of the movable steering column portion showing a release member of the hand operated release mechanism, and a push rod and a pair of biasing members of the telescoping mechanism in accordance with one embodiment of the present invention.
Figure 12:
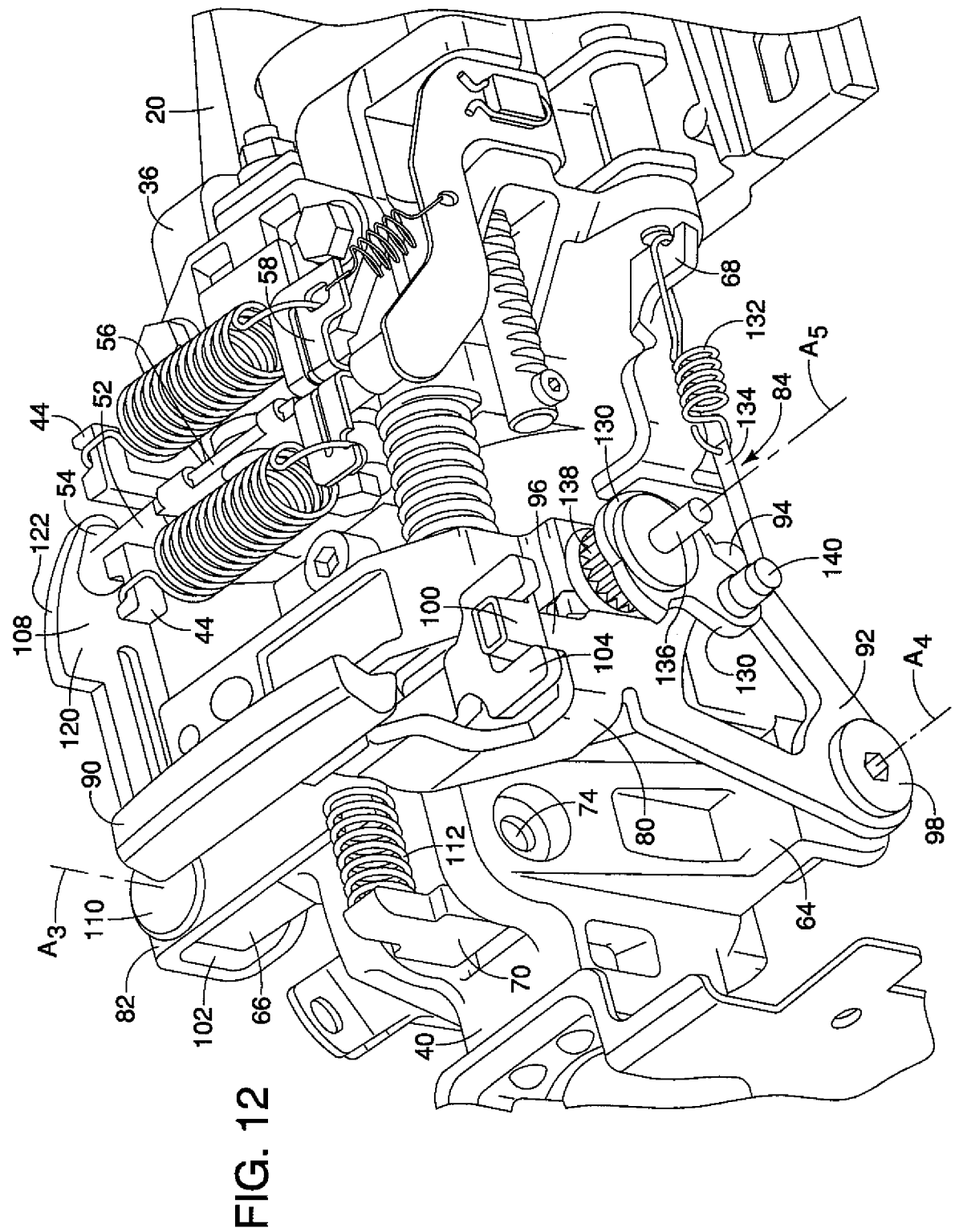
FIG. 12 is a perspective side view of the movable steering column portion with the movable steering column portion turned upside down, showing a lever, portions of the release member and a biasing assembly of the hand operated release mechanism in accordance with one embodiment of the present invention.

A description of the tilting housing 40 (a tilting part) is now provided with specific reference to FIGS. 8-12. The tilting housing 40 is basically a hollow member that includes a shaft support portion 60 (FIGS. 9 and 10 only), pivot portions 62 (FIG. 8 only), a first lever support portion 64 and a second lever support portion 66 (FIGS. 8, 11 and 12 only). The shaft support portion 60 is defined within the hollow interior of the tilting housing 40 and supports bearings of the shaft portion 26c as shown in FIG. 9. The pivot portions 62 are basically conventional short shaft elements that extend into corresponding apertures (not shown) in the telescoping housing 36. The pivot portions 62 allow the tilting housing 40 to tilt with respect to the telescoping housing 36 in a conventional manner. More specifically, the pivot portions 62 extend along the axis $A_1$ such that the tilting housing 40 can undergo angular displacement about the axis $A_1$. The U-joint 28b is centered on the axis $A_1$ and therefore, the shaft portion 26c of the shaft assembly 26 can tilt with the tilting housing 40. Hence, the shaft assembly 26 can be turned and steering motions from the steering wheel S can be transmitted through the portions of the shaft assembly 26 regardless of the tilt angle of the tilting housing 40 with respect to the telescoping housing 36. As shown in FIG. 12, the first lever support portion 64 includes a spring attachment portion 68. The first lever support portion 64 and the second lever support portion 66 support various elements of the tilting mechanism 42, as described below.

In understanding the various aspects of the present invention, relative perspective are important to recognize. For example, the tilting housing 40 is supported by and is pivotable relative to the telescoping housing 36. The tilting housing 40 and the telescoping housing 36 undergo telescopic movements as a single assembly. Therefore, relative to the fixed steering column portion 16, both the tilting housing 40 and the telescoping housing 36 define a movable portion of the steering column structure 12.

From different perspective, the tilting housing 40 can tilt relative to the telescoping housing 36. Therefore, relative to the tilting housing, the telescoping housing 36 and the fixed steering column portion 16 define a fixed portion of the steering column structure 12.

A description of the tilting mechanism 42 is now provided with specific reference to FIGS. 9 and 10. The tilting mechanism 42 is configured to selectively adjust an angle of inclination of the tilting housing 40 (the tilting part) and the steering wheel S relative to the fixed steering column portion 16 and the telescoping housing 38. The tilting mechanism 42 basically includes the tilt lock portion 46 of the telescoping housing 36, a pawl member 70 and a locking wedge 72. The pawl member 70 is pivotally supported on the tilting housing 40 by a pivot shaft 74. The pivot shaft 74 extends through the pawl member 70 as shown in FIGS. 9 and 10 and further extends through the tilting housing 40 as indicated in FIG. 12. The pawl member 70 includes a curved surface that mates with the curved surface of the tilt lock portion 46. The curved surface of the pawl member 70 includes a plurality of serrations or parallel gear teeth dimensioned to mate with the tilt lock portion 46.

The locking wedge 72 is movable in and out of the area adjacent to the pawl member 70. As shown in FIG. 9, when the locking wedge 72 is wedged against the pawl member 70, the pawl member 70 is brought into engagement with the tilt lock portion 46 of the telescoping housing 36, thus locking the tilting angle of the tilting housing 40 relative to the fixed steering column portion 16 and the telescoping housing 38. As shown in FIG. 10, when the locking wedge 72 is moved away from the pawl member 70, the pawl member 70 is free to pivot about the pivot shaft 74 and away from the tilt lock portion 46 of the telescoping housing 36. As also indicated in FIG. 10, with the pawl member 70 free to pivot, the tilting angle of the tilting housing 40 can be adjusted. The locking wedge 72 is a part of the hand operated release mechanism 14 and is described in greater detail below.

With specific reference to FIG. 12, a description of the hand operated release mechanism 14 is now provided. The hand operated release mechanism 14 basically includes the push rod 52, a first lever member 80, a second lever member 82 and a biasing assembly 84. In the description of the present invention, the first lever member 80 is a hand operated release member and the second lever member 82 is a release member that is interconnected to move with the first lever member 80, as described in greater detail below. However, since the first and second lever members 80 and 82 are interconnected and move together, the terms hand operated release member and release member are interchangeable and apply equally to both members.

The first lever member 80 includes an operating end 90, a pivot portion 92, a geared portion 94 and a connecting portion 96.

The operating end 90 of the first lever member 80 includes a handle that extends away from the tilting housing 40. The pivot portion 92 pivots about an axis $A_4$ defined by a pivot shaft 98 supported by the first lever support portion 64 of the tilting housing 40. The geared portion 94 includes an arcuate shaped surface with a plurality of gear teeth having the pivot shaft 98 as its center. The connecting portion 96 includes a small protrusion with a bushing 100 fitted thereon.

Figure 13:
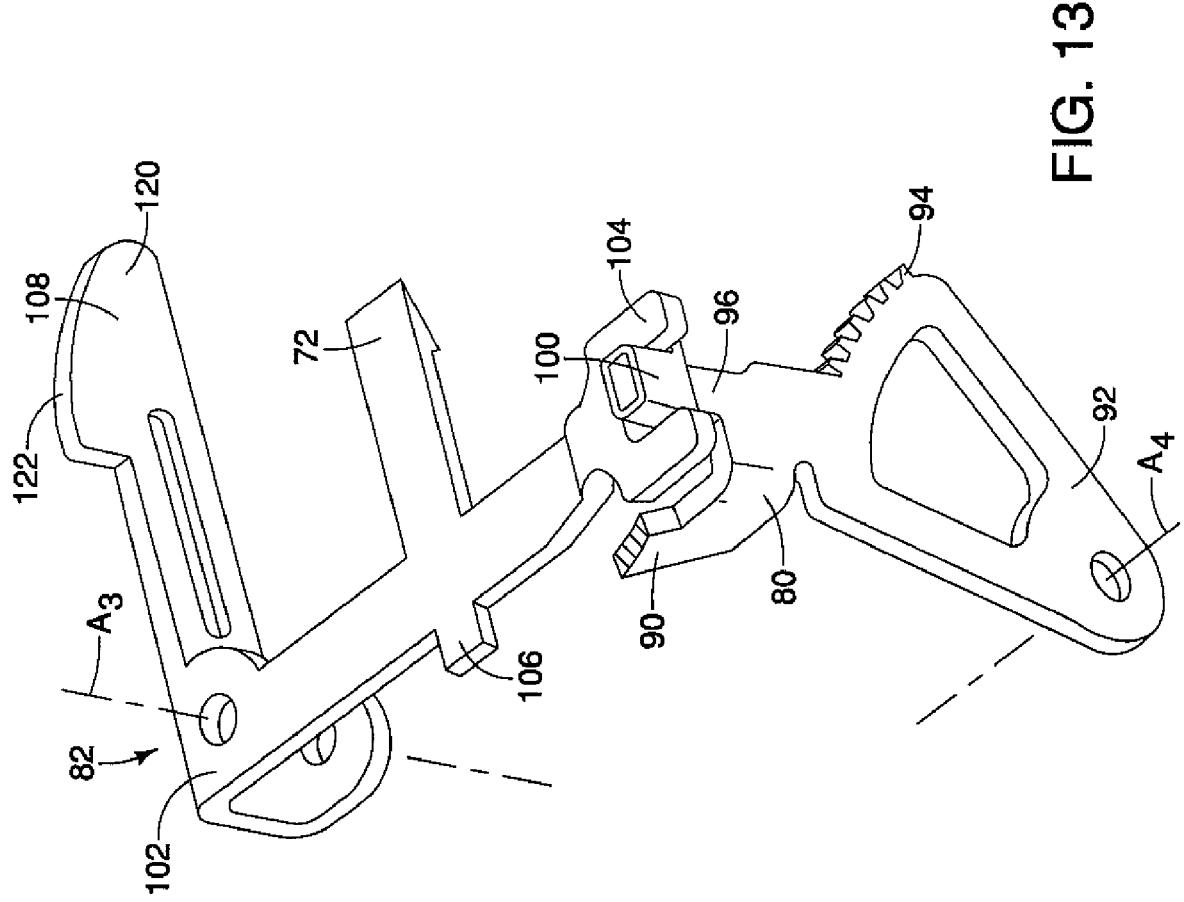
FIG. 13 is a perspective view of portions of the hand operated release mechanism (turned upside down) showing the lever and the release member shown removed from the movable steering column portion in accordance with one embodiment of the present invention.

As shown more clearly in FIG. 13, the second lever member 82 includes a pivot portion 102, a connecting portion 104, the locking wedge 72, a spring retaining projection 106 and an actuating section 108. The pivot portion 102 is supported on the second lever support portion 66 for pivotal movement about an axis $A_3$ by a pivot pin 110, as shown in FIG. 12. As shown in FIGS. 12 and 13, the connecting portion 104 included a U-shaped recess that receives the bushing 100 on the connecting portion 96 of the first lever member 80. Hence, the first and second lever members 80 and 82 are linked to move together by the connection between the connecting portion 104 and the bushing 100 of the connecting portion 96.

As shown in FIG. 11, the actuating section 108 of the second lever member 82 is coupled to tilting housing 40 of the movable steering column portion 18 for pivotal movement about the pivot axis $A_3$. Further, the pivot axis $A_3$ is perpendicular to and spaced apart from the axis $A_2$.

The locking wedge 72 extends from an intermediate portion of the second lever member 82 and is formed integrally therewith. The spring retaining projection 106 is configured to retain a biasing spring 112. The biasing spring 112 presses against the pawl member 70 such that when the locking wedge 72 is moved toward the left side of FIG. 12, the pawl member 70 is pivoted about the pivot shaft 74 and away from the tilt lock portion 46 of the telescoping housing 36 as indicated in FIG. 10.

The actuating section 108 (an actuation end) is an elongated and generally flat projection extending from the pivot portion 102. The actuating section 108 includes an actuating surface 120 having a curved edge 122. The actuating surface 120 is positioned to contact the contact section 54 of the push rod 52 when the first lever member 80 is moved from a locking orientation (FIGS. 6 and 9) to a releasing orientation (FIGS. 7 and 10). The actuating section 108 is dimensioned to extend from the pivot portion 102 along a lower edge of the telescoping housing 36 such that the axis $A_2$ of the push rod 52 extends through the actuating section 108 regardless of the tilt angle of the tilting housing 40 relative to the telescoping housing 36.

A description of the biasing assembly 84 is now provided with specific reference to FIGS. 12 and 14-16. The biasing assembly 84 basically includes the first lever member 80, a cam wheel 130, a biasing member 132 and a flexible connecting portion 134. The cam wheel 130 basically includes an elongated pivot shaft 136 (a shaft extension), a plurality of gear teeth 138 (FIG. 12 only) and a biasing spring attachment pin 140. The pivot shaft 136 defines a pivot axis $A_5$ that at least partially extends through the tilting housing 40 of the movable steering column portion 18. The pivot shaft 136 extends outward from an outer side of the cam wheel 130 to form a shaft extension. The biasing spring attachment pin 140 also extends outward from the cam wheel 130. However the biasing spring attachment pin 140 is spaced apart from the pivot shaft 136 and is preferably located proximate an outer peripheral portion of the cam wheel 130.

As is shown in FIG. 12, the first lever member 80 (a release member) is pivotable about the pivot axis $A_4$. The pivot axis $A_4$ extends in a direction generally parallel to the pivot shaft 136 of the cam wheel 130 and the pivot axis $A_5$. The gear teeth 138 are dimensioned to engage the geared teeth of the geared portion 96 of the first lever member 80. Hence, as the first lever member 80 is pivoted about the pivot axis $A_4$, the cam wheel 130 rotates about the pivot axis $A_5$. Further, as the cam wheel 130 rotates the biasing spring attachment pin 140 circles around the pivot shaft 136.

The biasing member 132 is preferably a coil spring that is attached at one end to the spring attachment portion 68 of the first lever support portion 64 of the tilting housing 40. The opposite end of the biasing member 132 is connected to a first end of the flexible connecting portion 134. A second end of the flexible connecting portion 134 is connected to the biasing spring attachment pin 140 on the cam wheel 130. Hence, the biasing member 132 is operably coupled to the cam wheel 130 such that the biasing force of the biasing member 132 is transmitted through the cam wheel 130 to the first lever member 80 (the release member).

The flexible connecting portion 134 is preferably an elongated metal strip that is not elastic but will flexibly bend. It should be understood from the description and drawings that the biasing member 132 can be made of any of a variety of materials, such as elastic polymer materials or rubber-like materials and is not limited to a metallic coil spring. Further the flexible connecting portion 134 can be made of any of a variety of materials that are flexible (bendable), but preferably not elastic (materials that do not plastically stretch or elongate). Further, the biasing member 132 and the flexible connecting portion 134 are shown as two separate members. However it should be understood from the drawings and the description that the biasing member 132 and the flexible connecting portion 134 can be made integrally as a single element.

As indicated in FIGS. 14, 15 and 16, the geometry of the first lever member 80 and biasing assembly 84 is such that as the first lever member 80 is moved, the gear teeth of the geared portion 94 of the first lever member 80 cause the cam wheel 130 to rotate. The first lever member 80 moves within a prescribed movement range R (FIG. 16) that includes a first movement portion $R_1$ and a second movement portion $R_2$. Further, as indicated in FIG. 13, the second lever member 82 moves with movement of the first lever member 80. Hence, the second lever member 82 is movably mounted between the locking orientation and the releasing orientation along the prescribed movement range R of the first lever member 80.

The locking orientation corresponds to 0 degrees of movement of the first lever member 80, as shown in FIG. 14. The releasing orientation corresponds to approximately 15 degrees of movement of the first lever member 80, as shown in FIG. 16. Further, the prescribed movement range R is such that the second movement portion $R_2$ is subsequent to the first movement portion $R_1$, with a transition point located between the first and second movement portions $R_1$ and $R_2$. The transition point is shown in FIG. 15 and is spaced from both the releasing and locking orientations. The transition point is reached once the flexible connecting portion 134 contacts the pivot shaft 136.

The first movement portion $R_1$ of the prescribed movement range R of the first lever member 80 is represented by movement between the position of the first lever member 80 and the cam wheel 130 shown FIG. 14 and the position shown in FIG. 15. The second movement portion $R_2$ of the prescribed movement range R of the first lever member 80 is represented by movement between the position of the first lever member 80 and the cam wheel 130 shown FIG. 15 and the position shown in FIG. 16. More specifically, as the first lever member 80 moves along the first movement portion $R_1$ of the prescribed movement range R the flexible connecting portion 134 (an extension portion) and the biasing member 132 are initially spaced apart from the pivot shaft 136 (the shaft extension) until the transition point is reached, as shown in FIG. 15. Hence, the upper end of the first movement portion $R_1$ of the prescribed movement range R is depicted in FIG. 15.

Along the second movement portion $R_2$ of the prescribed movement range R the flexible connecting portion 134 contacts the pivot shaft 136 and wraps part way around the pivot shaft 136. Hence, the beginning of the second movement portion $R_2$ of the prescribed movement range R is depicted in FIG. 15 and the end of the second movement portion $R_2$ of the prescribed movement range R is depicted in FIG. 16.

The biasing member 132 biases the first lever member 80 and the second lever member 82 into the locking orientation such that along the first movement portion $R_1$ of the prescribed movement range R the biasing member 132 pivots about the spring attachment portion 68 (a fixed point) on tilting housing 40 of the movable steering column portion 18 as shown in FIGS. 14 and 15. Further, along the second movement portion $R_2$ of the prescribed movement range R the biasing member 132 remains generally stationary because the flexible connecting portion 134 is being partially wrapped about the pivot shaft 136, as shown in FIG. 16.

The biasing member further biases the first lever member 80 and the second lever member 82 (the release member) to the locking orientation such that the biasing force of the biasing member 132 applied to the first lever member 80 and the second lever member 82 (the release member) changes with corresponding movement of the first lever member 80 and the second lever member 82 (the release member) along the first movement portion. The biasing force changes with corresponding movement of the first lever member 80 and the second lever member 82 along the first movement portion $R_1$ because the biasing member 132 is being elongated. If the biasing member 132 is, for example, a coil spring, the biasing force preferably increases linearly as the first lever member 80 moves from the position depicted in FIG. 14 toward the position depicted in FIG. 15.

Further, the biasing force of the biasing member 132 is generally constant with movement of the release member along the second movement portion $R_2$. The biasing force of the biasing member 132 is generally constant with movement of the release member along the second movement portion $R_2$ because the flexible connecting portion 134 wraps around the pivot shaft 136 and the biasing member 132 overall generally stops elongating.

Therefore, the biasing force of the biasing member 132 applied to the first lever member 80 and the second lever member 82 (the release member) increases linearly with movement of the first lever member 80 and the second lever member 82 along the first movement portion $R_1$ of the prescribed movement range R.

The first movement portion $R_1$ of the prescribed movement range R corresponds to approximately 0 to 7 degrees of rotation of the first lever member 80 about the pivot axis $A_4$ with 0 degrees of rotation corresponding to the locking orientation. The second movement portion $R_2$ of the prescribed movement range R corresponds to approximately 7-15 degrees of rotation of the release member about the pivot axis $A_4$.

The biasing assembly 84 can be used with hand operated release mechanism of a steering column structure that includes either or both of the telescoping mechanism 38 and the tilting mechanism 42. More specifically, the biasing assembly 84 can be incorporated into a telescoping mechanism or can be incorporated with a tilting mechanism. In other words, the inventors anticipate the biasing assembly 84 be used in any of a variety of configurations, not just the depicted configuration with both the telescoping mechanism 38 and the tilting mechanism 42.

As described above, when the first lever member 80 is moved from the locking orientation (FIGS. 6, 9) to the releasing orientation (FIGS. 7 and 10), the second lever member 82 (the release member) selectively operates both the tilting mechanism and the telescoping mechanism for selective operation thereof. Specifically, movement of the first lever member 80 about the pivot axis $A_4$ causes the second lever member 82 to pivot about the pivot axis $A_3$. As the second lever member 82 pivots about the pivot axis $A_3$, the locking wedge 72 moves out from locking contact with the pawl member 70 and the actuation section 108 pushes against the contact section 54 of the push rod 52. When the locking wedge 72 moves out from locking contact with the pawl member 70 the tilting housing 40 is able to pivot about the pivot axis $A_1$. When the actuation section 108 pushes against the contact section 54 of the push rod 52, the locking members 45 are pulled away from the cylindrically shaped support shell 30 and the movable steering column portion 18 is free to slide in a telescoping movement relative to the fixed steering column portion 16.

With the biasing assembly 84 providing a biasing force on the first lever member 80, when the first lever member 80 in the releasing orientation, the first lever member 80 is urged to return to the locking orientation. The first lever member 80 is also biased back toward the locking orientation by force from the springs 53 acting on the push rod 52 and on the second lever member 82. Since the push rod 52 can contact the actuating surface 120 of the actuating section 108 of the second lever member 82 and the second lever member 82 is linked to the first lever member 80, the biasing force of the springs 52 assists in returning the first lever member 80 to the locking orientation.

There are several geometric relationships that are related to understanding the operation of the hand operated release mechanism 14. For instance, the push rod 52 (the actuation member) undergoes reciprocating movement along the axis $A_2$. The axis $A_2$ extends in a direction that is generally parallel to the axis $A_1$. The contact section 54 extends in a direction approximately perpendicular to the axis $A_2$. The tilting housing 40 (the tilting part) is configured to pivot about the axis $A_1$. The axis $A_1$ is fixed relative to telescoping housing 36 of the movable steering column portion 18. Since the first and second lever members 80 and 82 are directly supported on portions of the tilting housing 40, the first and second lever members 80 and 82 tilt with the tilting housing 40 relative to the telescoping housing 36. Consequently, the actuating section 108 of the second lever member 82 pivots about the axis $A_1$. Preferably, the curved edge 122 is arcuately shaped with the axis $A_1$ as a center. The push rod 52 is supported on the telescoping housing 36 and moves with the telescoping housing 36. Therefore, the contact between the contact section 54 of the push rod 52 and the actuating surface 120 of the actuating section 108 of the second lever member 82 can change with changes of the tilt angle of the tilting housing 36.

A description is now provided of interactions between the push rod 52 and the second lever member 82. The push rod 52 is biased in a direction such that the contact section 54 of the push rod 52 (an actuation member) is urged toward the actuating surface 120 of the second lever member 82. As represented schematically in FIGS. 17-20, the contact surface 54 of the push rod 52 contacts the actuating surface 120 of the second lever member 82 (part of the hand operated release lever) such that at least one point P of the actuating end of the second lever member 82 always contacts the contact section 54 regardless of the tilt angle of the tilting mechanism 38 when the first lever member 80 of the hand operated release mechanism 14 is operated.

Figure 17:
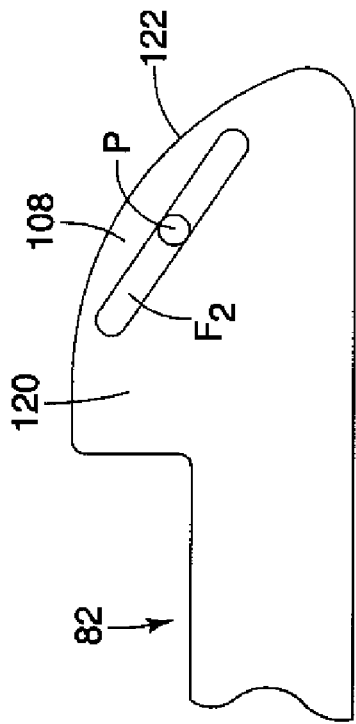
FIG. 17 is a schematic side view of a portion of the release member showing a first footprint representing contact between the release member and the push rod with the tilting housing tilted downward (as shown in FIG. 2) in accordance with one embodiment of the present invention.
Figure 18:
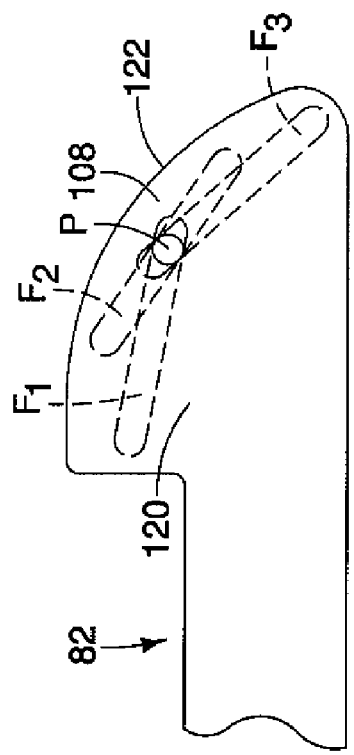
FIG. 18 is another schematic side view of the portion of the release member similar to FIG. 17 showing a second footprint representing contact between the release member and the push rod with the tilting housing tilted to an intermediate position between the tilted downward position (shown in FIG. 2) and the tilted upward position (shown in FIG. 4) in accordance with one embodiment of the present invention.
Figure 19:
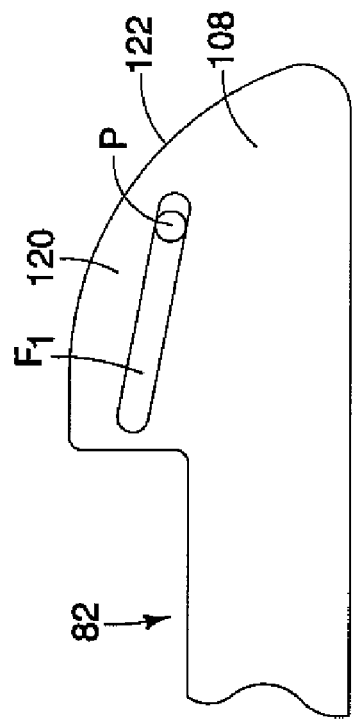
FIG. 19 is still another schematic side view of the portion of the release member similar to FIGS. 17 and 18 showing a third footprint representing contact between the release member and the push rod with the tilting housing tilted upward (as shown in FIG. 4) in accordance with one embodiment of the present invention.
Figure 20:
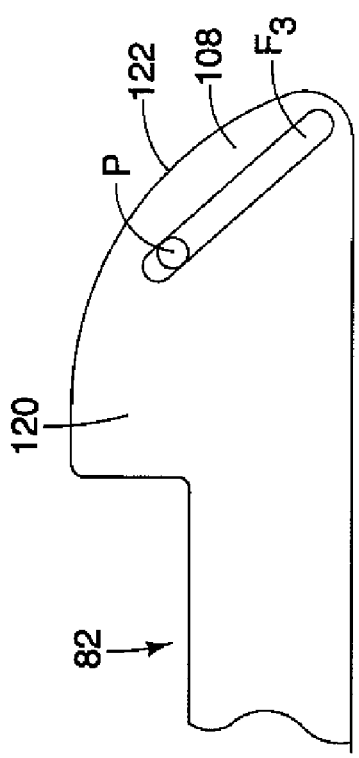
FIG. 20 is a schematic side view of the portion of the release member similar to FIGS. 17-18 showing the first, second and third footprints superimposed on one another showing a footprint overlapping region in accordance with one embodiment of the present invention.

Specifically, the contact section 54 of the push rod 52 (the actuation member) contacts the actuating surface 120 (the actuating end of the hand operated release member) defining a plurality of footprints such as the footprints $F_1$, $F_2$ and $F_3$. Each one of the footprints $F_1$, $F_2$ and $F_3$ corresponding to a respective tilt angle of the tilting housing 40 (the tilting part) relative to the telescoping housing 36 (the telescoping part). As indicated in FIG. 17, the footprint $F_1$ corresponds to a tilt angle with the tilting housing 40 tilted downward (as shown in FIG. 2). As indicated in FIG. 18, the footprint $F_2$ corresponds to an intermediate position or tilt angle of the tilting housing 40 that is between the tilted downward position (shown in FIG. 2) and the tilted upward position (shown in FIG. 4). As indicated in FIG. 19, the footprint $F_3$ corresponds to the tilting housing 40 tilted upward (as shown in FIG. 4). As indicated in FIG. 20, the footprints $F_1$, $F_2$ and $F_3$ overlap one another to define an overlapping region that has at least one point P. The point P is defined or located proximate a central region of the actuating surface 120.

With the overlapping region and the point P, the return biasing force exerted from the springs 53, through the push rod 52 and to the second lever member 82 remains generally constant with only a small variation as the tilt angle changes.

In other words, the actuating section 108 (the actuating end of the hand operated release member) of the second lever member 82 and the contact section 54 of the push rod 52 (the actuation member) are configured and arranged relative to each other to reduce variations in the biasing force applied by the springs 53 on the second lever member 82 regardless of the tilt angle of the tilting mechanism 38.

The inventors anticipate that the biasing force applied by the contact section 54 of the push rod 52 (the actuation member) to the actuating section 108 of the hand operated release mechanism 14 will vary by no more than 5% at any one pivot angle of the tilting housing 40 (and the hand operated release mechanism 14) relative to the pivot axis $A_1$.

The second lever member 82 pivots about the axis $A_3$. Therefore, the biasing force applied by the contact section 54 of the push rod 52 creates a moment on the actuating section 108 about the axis $A_3$. A moment is defined by the distance between the axis $A_3$ and the center of the force applied (i.e., the point of contact or footprint) multiplied by the force applied by the push rod 52. The inventors anticipate that the moment created by the biasing force applied by the contact section 54 of the push rod 52 on the second lever member 82 is more consistent and has less variation than in the prior art. The configuration of the present invention provides a driver with a more consistent feel when moving the first lever member 80 between the locking orientation and the releasing orientation, regardless of the tilt angle of the tilt housing 40.

Second Embodiment

Figure 21:
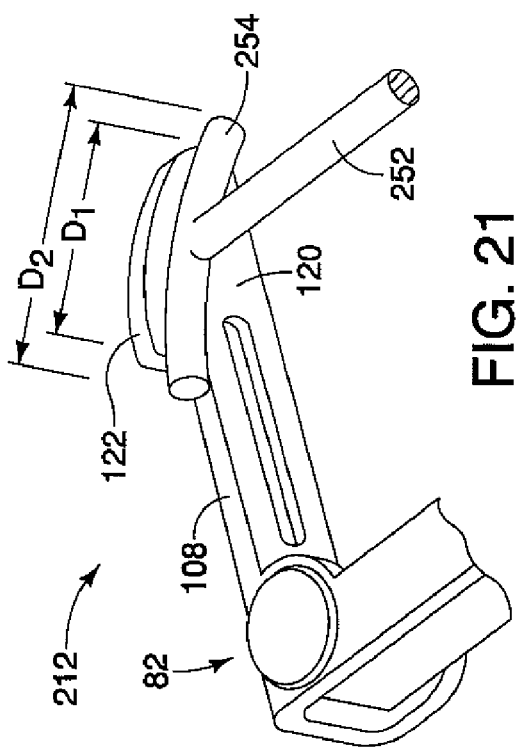
FIG. 21 is a perspective view similar to FIG. 13, showing a portion of the release member and a portion of a push rod in accordance with a second embodiment of the present invention.

Referring now to FIG. 21, a portion of a steering column structure 212 having a push rod 252 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The steering column structure 212 of the second embodiment is identical in all ways to the steering column structure 12 of the first embodiment except that the push rod 52 of the first embodiment has been replaced with the push rod 252. The push rod 252 is identical to the push rod 52 of the first embodiment except that the contact section 54 has been replaced with contact section 254. The contact section 254 has an overall arcuate shape. The curved edge 122 of the actuating surface 120 of the actuating section 108 of the second lever member 82 has a length $D_1$. The contact section 254 has an arcuate length $D_2$ that is greater than the length $D_1$. Consequently, as the second lever member 82 pivots or tilts with respect to the push rod 252, the contact section 254 and the actuating surface 120 make contact with one another such that variations in return biasing force transmitted from the push rod 252 to the second lever member 82 are reduced or eliminated.

Third Embodiment

Figure 22:
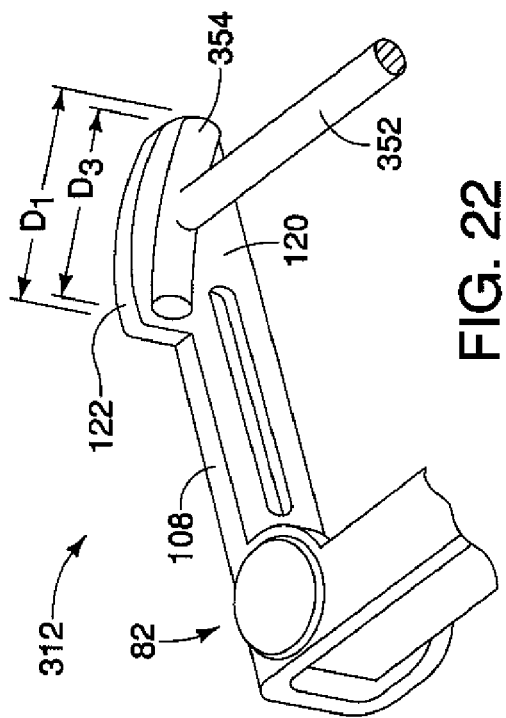
FIG. 22 is a perspective view similar to FIG. 21, showing a portion of the release member and a portion of a push rod in accordance with a third embodiment of the present invention.

Referring now to FIG. 22, a portion of a steering column structure 312 having a push rod 352 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The steering column structure 312 of the third embodiment is identical in all ways to the steering column structure 12 of the first embodiment except that the push rod 52 of the first embodiment has been replaced with the push rod 352. The push rod 352 is identical to the push rod 52 of the first embodiment except that the contact section 54 has been replaced with contact section 354. The contact section 354 has an overall arcuate shape. The curved edge 122 of the actuating surface 120 of the actuating section 108 of the second lever member 82 has the length $D_1$. The contact section 354 has an arcuate length $D_3$ that is about the same or slightly less than the length $D_1$. Consequently, as the second lever member 82 pivots or tilts with respect to the push rod 352, the contact section 354 and the actuating surface 120 make contact with one another such that variations in return biasing force transmitted from the push rod 352 to the second lever member 82 are reduced or eliminated.

Fourth Embodiment

Figure 23:
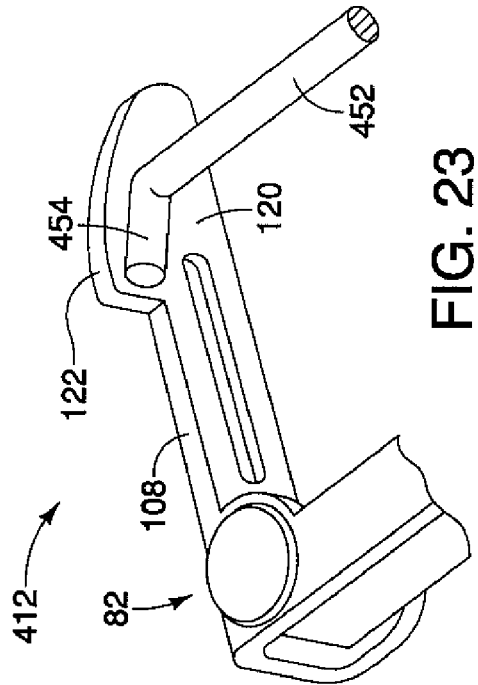
FIG. 23 is a perspective view similar to FIG. 21, showing a portion of the release member and a portion of a push rod in accordance with a fourth embodiment of the present invention.

Referring now to FIG. 23, a portion of a steering column structure 412 having a push rod 452 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The steering column structure 412 of the fourth embodiment is identical in all ways to the steering column structure 12 of the first embodiment except that the push rod 52 of the first embodiment has been replaced with the push rod 452. The push rod 452 is identical to the push rod 52 of the first embodiment except that the contact section 54 has been replaced with contact section 454. The contact section 454 extends in a direction opposite that of the contact section 54 of the first embodiment. Consequently, as the second lever member 82 pivots or tilts with respect to the push rod 452, the contact section 454 and the actuating surface 120 make contact with one another such that variations in return biasing force transmitted from the push rod 452 to the second lever member 82 are reduced or eliminated.

Fifth Embodiment

Figure 24:
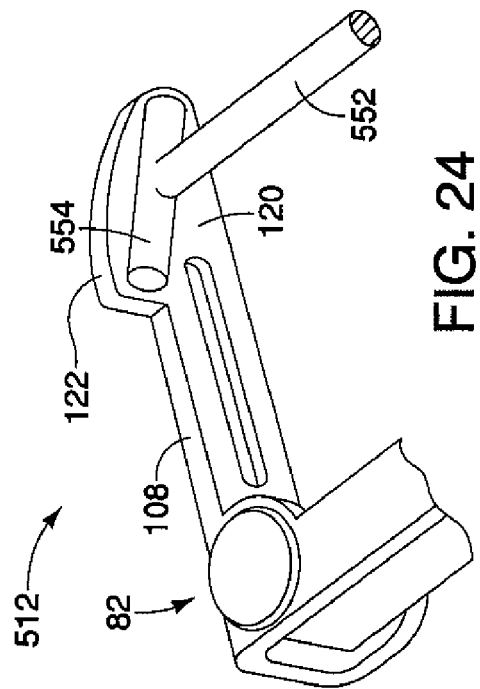
FIG. 24 is a perspective view similar to FIG. 21, showing a portion of the release member and a portion of a push rod in accordance with a fifth embodiment of the present invention.

Referring now to FIG. 24, a portion of a steering column structure 512 having a push rod 552 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The steering column structure 512 of the fifth embodiment is identical in all ways to the steering column structure 12 of the first embodiment except that the push rod 52 of the first embodiment has been replaced with the push rod 552. The push rod 552 is identical to the push rod 52 of the first embodiment except that the contact section 54 has been replaced with contact section 554. The contact section 554 extends in opposite directions away from a main body portion of the push rod 552. Consequently, as the second lever member 82 pivots or tilts with respect to the push rod 552, the contact section 554 and the actuating surface 120 make contact with one another such that variations in return biasing force transmitted from the push rod 552 to the second lever member 82 are reduced or eliminated.

Sixth Embodiment

Figure 25:
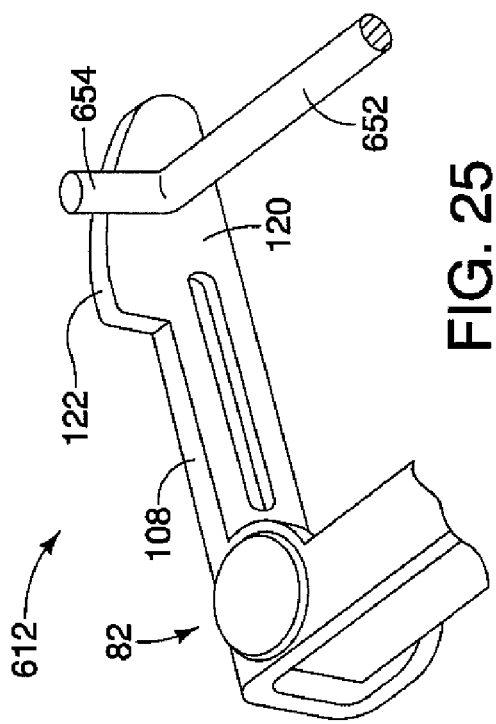
FIG. 25 is a perspective view similar to FIG. 21, showing a portion of the release member and a portion of a push rod in accordance with a sixth embodiment of the present invention.

Referring now to FIG. 25, a portion of a steering column structure 612 having a push rod 652 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The steering column structure 612 of the sixth embodiment is identical in all ways to the steering column structure 12 of the first embodiment except that the push rod 52 of the first embodiment has been replaced with the push rod 652. The push rod 652 is identical to the push rod 52 of the first embodiment except that the contact section 54 has been replaced with contact section 654. The contact section 654 extends outward relative to the actuating surface 120. Consequently, as the second lever member 82 pivots or tilts with respect to the push rod 652, the contact section 654 and the actuating surface 120 make contact with one another such that variations in return biasing force transmitted from the push rod 652 to the second lever member 82 are reduced or eliminated.

Seventh Embodiment

Figure 26:
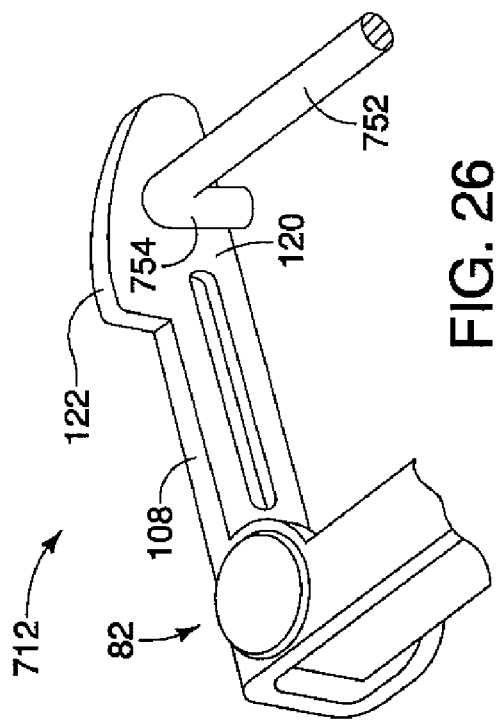
FIG. 26 is a perspective view similar to FIG. 21, showing a portion of the release member and a portion of a push rod in accordance with a seventh embodiment of the present invention.

Referring now to FIG. 26, a portion of a steering column structure 712 having a push rod 752 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The steering column structure 712 of the seventh embodiment is identical in all ways to the steering column structure 12 of the first embodiment except that the push rod 52 of the first embodiment has been replaced with the push rod 752. The push rod 752 is identical to the push rod 52 of the first embodiment except that the contact section 54 has been replaced with contact section 754. The contact section 754 extends inward relative to the actuating surface 120. Consequently, as the second lever member 82 pivots or tilts with respect to the push rod 752, the contact section 754 and the actuating surface 120 make contact with one another such that variations in return biasing force transmitted from the push rod 752 to the second lever member 82 are reduced or eliminated.

Eighth Embodiment

Figure 27:
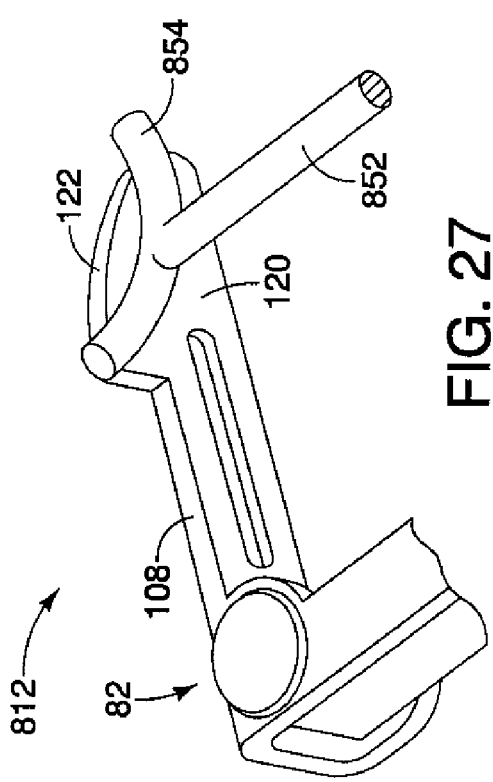
FIG. 27 is a perspective view similar to FIG. 21, showing a portion of the release member and a portion of a push rod in accordance with a eighth embodiment of the present invention.

Referring now to FIG. 27, a portion of a steering column structure 812 having a push rod 852 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

The steering column structure 812 of the eighth embodiment is identical in all ways to the steering column structure 12 of the first embodiment except that the push rod 52 of the first embodiment has been replaced with the push rod 852. The push rod 852 is identical to the push rod 52 of the first embodiment except that the contact section 54 has been replaced with contact section 854. The contact section 854 extends inward relative to the actuating surface 120. Consequently, as the second lever member 82 pivots or tilts with respect to the push rod 852, the contact section 854 and the actuating surface 120 make contact with one another such that variations in return biasing force transmitted from the push rod 852 to the second lever member 82 are reduced or eliminated.

Ninth Embodiment

Figure 28:
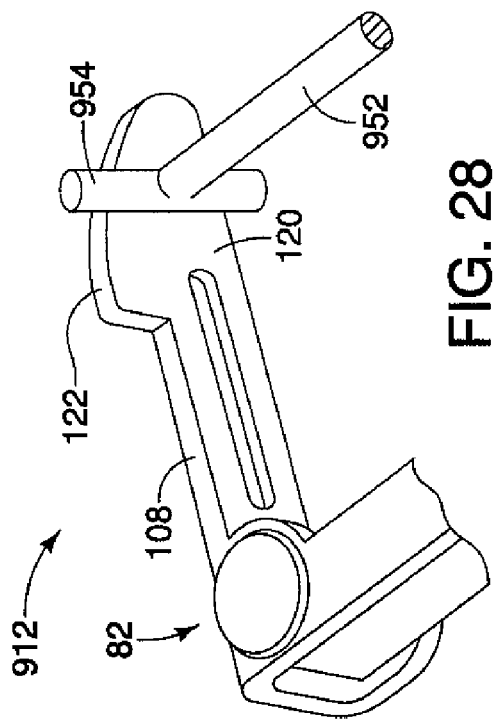
FIG. 28 is a perspective view similar to FIG. 21, showing a portion of the release member and a portion of a push rod in accordance with a ninth embodiment of the present invention.

Referring now to FIG. 28, a portion of a steering column structure 912 having a push rod 952 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

The steering column structure 912 of the ninth embodiment is identical in all ways to the steering column structure 12 of the first embodiment except that the push rod 52 of the first embodiment has been replaced with the push rod 952. The push rod 952 is identical to the push rod 52 of the first embodiment except that the contact section 54 has been replaced with contact section 954. The contact section 954 extends inward relative to the actuating surface 120. Consequently, as the second lever member 82 pivots or tilts with respect to the push rod 952, the contact section 954 and the actuating surface 120 make contact with one another such that variations in return biasing force transmitted from the push rod 952 to the second lever member 82 are reduced or eliminated.

The various features of the vehicle 10 are conventional components that are well known in the art. Since vehicles 10 are well known in the art, those structures of a vehicle not directly related to the steering column structure of the present invention will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle steering column structure comprising:
a fixed steering column portion;
a movable steering column portion movably coupled to the fixed steering column portion;
a steering column positioning mechanism operably coupled between the fixed and movable steering column portions for adjusting a relative position therebetween, the steering column positioning mechanism including:
a cam wheel rotatable about a first pivot axis, the cam wheel having a shaft extension;
a release member that is pivotable about a second pivot axis extending in a direction generally parallel to the first pivot axis, the release member being movably mounted between a locking orientation and a releasing orientation along a prescribed movement range having a first movement portion and a second movement portion subsequent to the first movement portion, with a transition point located between the first and second movement portions that is spaced from the releasing and locking orientations;
a biasing member operably coupled to the cam wheel such that biasing force of the biasing member is transmitted through the cam wheel to the release member, and the shaft extension of the cam wheel is positioned such that along the first movement portion of the prescribed movement range the biasing member is spaced apart from the shaft extension and along the second movement portion of the prescribed movement range the biasing member contacts the shaft extension.

2. The steering column structure according to claim 1, wherein
the biasing force of the biasing member applied to the release member increases linearly with movement of the release member along the first movement portion of the prescribed movement range.

3. The steering column structure according to claim 1, wherein
the steering column positioning mechanism includes a tilting mechanism operably coupled to the movable steering column portion configured to selectively position a section of the movable steering column portion with respect to the fixed steering column portion, and
the release member is operably coupled to the tilting mechanism for selective operation thereof.

4. The steering column structure according to claim 3, wherein
the steering column positioning mechanism includes a telescoping mechanism operably coupled between the fixed and movable steering column portions, and
the release member is operably connected to the telescoping mechanism for selective operation thereof.

5. The steering column structure according to claim 1, wherein
the steering column positioning mechanism includes a telescoping mechanism operably coupled between the fixed and movable steering column portions, and
the release member is operably connected to the telescoping mechanism for selective operation thereof.

6. The steering column structure according to claim 1, wherein
the first pivot axis at least partially extends through the movable steering column portion.

7. The steering column structure according to claim 1, wherein
the biasing member includes a first end fixed to an outer peripheral portion of the cam wheel and a second end coupled to a fixed point on the movable steering column portion.

8. The steering column structure according to claim 7, wherein
the biasing member biases the release member into the locking orientation such that along the first movement portion of the prescribed movement range a section of the biasing member pivots about the fixed point on the movable steering column portion and along the second movement portion of the prescribed movement range the biasing member remains generally stationary.

9. The steering column structure according to claim 1, wherein
the release member pivots about a pivot axis that extends through the movable steering column portion, and
the first movement portion of the prescribed movement range corresponds to approximately 0 to 7 degrees of rotation of the release member about the pivot axis with 0 degrees of rotation corresponding to the locking orientation, and
the second movement portion of the prescribed movement range corresponds to approximately 7-15 degrees of rotation of the release member about the pivot axis.

10. The steering column structure according to claim 1, wherein
the biasing member includes a flexible connecting portion, the flexible connecting portion being dimensioned to contact the shaft extension of the cam wheel when the release member is positioned along the second movement portion.

11. The steering column structure according to claim 10, wherein
the flexible connecting portion includes a first end fixed to an outer peripheral portion of the cam wheel and a second end, the biasing member including a first end fixed to a second end of the flexible connecting portion, the biasing member also including a second end fixed to the movable steering column portion.

12. A steering column structure comprising:
a fixed steering column portion;
a movable steering column portion movably coupled to the fixed steering column portion;
a steering column positioning mechanism operably coupled to at least one of the fixed and movable steering column portions for controlling positioning of the movable steering column portion relative to the fixed steering column portion, the steering column positioning mechanism including:
a cam wheel rotatable about a first pivot axis, the cam wheel including a shaft extension extending along the first pivot axis;
a release member pivotable about a second pivot axis extending in a direction generally parallel to the first pivot axis, the release member being movably mounted between a locking orientation and a releasing orientation along a prescribed movement range having a first movement portion and a second movement portion subsequent to the first movement portion, with a transition point located between the first and second movement portions that is spaced from the releasing and locking orientations;
a flexible connecting portion;
a biasing member having a first end and a second end, the first end being coupled to a fixed point on the movable steering column portion, the second end being connected to the flexible connecting portion, the flexible connecting portion being operably connected to the release member through the cam wheel transmitting biasing force of the biasing member to the release member biasing the release member into the locking orientation such that along the first movement portion of the prescribed movement range the flexible connecting portion is spaced apart from the shaft extension and along the second movement portion of the prescribed movement range the flexible connecting portion contacts the shaft extension.

13. The steering column structure according to claim 12, wherein
the steering column positioning mechanism includes a tilting mechanism operably coupled to the movable steering column portion, and
the release member being operably connected to the tilting mechanism for selective operation thereof.

14. The steering column structure according to claim 13, wherein
the steering column positioning mechanism includes a telescoping mechanism operably coupled between the fixed and movable steering column portions, and
the release member being operably connected to the telescoping mechanism for selective operation thereof.

15. The steering column structure according to claim 12, wherein
the steering column positioning mechanism includes a telescoping mechanism operably coupled between the fixed and movable steering column portions, and the release member being operably connected to the telescoping mechanism for selective operation thereof.

16. The steering column structure according to claim 12, wherein
the first pivot axis at least partially extends through the movable steering column portion.

17. The steering column structure according to claim 12, wherein
the release member pivots about a pivot axis that extends through the movable steering column portion, and
the first movement portion of the prescribed movement range corresponds to approximately 0 to 7 degrees of rotation of the release member about the pivot axis with 0 degrees of rotation corresponding to the locking orientation, and
the second movement portion of the prescribed movement range corresponds to approximately 7-15 degrees of rotation of the release member about the pivot axis.

18. The steering column structure according to claim 12, wherein
the biasing member operably biases the release member into the locking orientation such that along the first movement portion of the prescribed movement range the biasing force of the biasing member applied to the release member increases linearly and along the second movement portion of the prescribed movement range the biasing force is generally constant.

19. A vehicle steering column structure comprising:
a fixed steering column portion;
a movable steering column portion movably coupled to the fixed steering column portion;
a steering column positioning mechanism operably coupled between the fixed and movable steering column portions for adjusting a relative position therebetween, the steering column positioning mechanism including:
a release member movably mounted between a locking orientation and a releasing orientation along a prescribed movement range having a first movement portion and a second movement portion subsequent to the first movement portion, with a transition point located between the first and second movement portions that is spaced from the releasing and locking orientations;
a biasing member biasing the release member to the locking orientation, the biasing member having an extending portion and a bending portion, the extending portion having a first end coupled to the movable steering column portion and a second end, the bending portion having a first end coupled to the release member and a second end connected to the second end of the extending portion, the first and second ends of the bending portion being co-linear with the first and second ends of the extending portion with the release member positioned within the first movement portion and the first end of the bending portion being non-co-linear with the first and second ends of the extending portion with the release member positioned within the second movement portion, the extending portion providing biasing force to the release member in the first movement portion and the bending portion providing biasing force in the second movement portion.

* * * * *